US007988984B2

(12) United States Patent
Hockaday

(10) Patent No.: US 7,988,984 B2
(45) Date of Patent: Aug. 2, 2011

(54) INSECT REPELLENT AND ATTRACTANT AND AUTO-THERMOSTATIC MEMBRANE VAPOR CONTROL DELIVERY SYSTEM

(75) Inventor: Robert G. Hockaday, Los Alamos, NM (US)

(73) Assignee: Energy Related Devices, Inc., Los Alamos, NM (US)

( * ) Notice: Subject to any disclaimer, the term of this patent is extended or adjusted under 35 U.S.C. 154(b) by 492 days.

(21) Appl. No.: 11/436,876

(22) Filed: May 18, 2006

(65) Prior Publication Data

US 2006/0260183 A1 Nov. 23, 2006

Related U.S. Application Data

(60) Provisional application No. 60/682,293, filed on May 18, 2005.

(51) Int. Cl.
*A01N 25/34* (2006.01)
*A01M 1/20* (2006.01)

(52) U.S. Cl. ........ 424/403; 424/405; 424/409; 424/411; 424/413; 514/875; 514/876; 514/919; 43/132.1; 43/111; 43/112; 43/113; 119/654

(58) Field of Classification Search .................... 43/124, 43/131, 129, 132.1; 514/875, 876, 919; 424/403, 424/405, 409, 413, 411, 416, DIG. 10, DIG. 7; 119/654, 655, 653
See application file for complete search history.

(56) References Cited

U.S. PATENT DOCUMENTS

| | | | | | |
|---|---|---|---|---|---|
| 1,732,028 | A | * | 10/1929 | Reiner | 239/36 |
| 2,138,040 | A | * | 11/1938 | Perry | 119/654 |
| 2,205,711 | A | * | 6/1940 | Banks | 119/654 |
| 2,764,969 | A | | 10/1956 | Weiss | |
| 3,605,321 | A | * | 9/1971 | Lazarus | 43/131 |
| 3,770,199 | A | * | 11/1973 | Hoek et al. | 239/54 |
| 3,814,061 | A | * | 6/1974 | Aries et al. | 119/654 |
| 3,826,036 | A | * | 7/1974 | Neugebauer | 43/131 |
| 3,896,995 | A | * | 7/1975 | Lelicoff | 239/36 |
| 3,951,622 | A | * | 4/1976 | Wilk | 239/6 |
| 3,987,578 | A | | 10/1976 | Rueff | |
| 4,017,030 | A | * | 4/1977 | Coplan et al. | 239/44 |
| 4,037,353 | A | * | 7/1977 | Hennart et al. | 43/129 |
| 4,158,440 | A | * | 6/1979 | Sullivan et al. | 239/6 |
| 4,171,340 | A | * | 10/1979 | Nishimura et al. | 422/36 |

(Continued)

FOREIGN PATENT DOCUMENTS

EP 93262 A1 * 11/1983

(Continued)

OTHER PUBLICATIONS

Rudolfs, Willem, Chemotropism of Mosquitoes, Mar. 1922, New Jersey Agricultural Experiment Stations.*

(Continued)

*Primary Examiner* — Joshua J Michener
(74) *Attorney, Agent, or Firm* — James Creighton Wray

(57) ABSTRACT

A membrane enclosed fluid diffusion system for insect attractants and repellents, auto thermostatic heaters, and chemical delivery using an additive and/or selectively permeable membrane that interacts with the enclosed fluid to maintain steady delivery rates over a range of temperature and humidity. Systems can be formed with permeable membranes, impermeable membranes, chemical hydrates, wicks, scent fluids, fuel fluids, catalytic heaters, energy conversion devices, visible images, infrared images, trapping systems, sound systems, electronics, and apparel. The device results in efficient and effective devices for mosquito control drug delivery, and portable heaters.

53 Claims, 7 Drawing Sheets

U.S. PATENT DOCUMENTS

| | | | | | |
|---|---|---|---|---|---|
| 4,678,583 | A | | 7/1987 | Willson, III et al. | |
| 4,765,982 | A | | 8/1988 | Ronning et al. | |
| 4,780,114 | A | | 10/1988 | Quinn et al. | |
| 4,804,142 | A | * | 2/1989 | Riley | 239/56 |
| 4,808,408 | A | | 2/1989 | Baker et al. | |
| 4,971,605 | A | | 11/1990 | Tarman | |
| 5,221,535 | A | | 6/1993 | Domb | |
| 5,364,626 | A | * | 11/1994 | Hasegawa et al. | 424/403 |
| 5,644,866 | A | * | 7/1997 | Katsuda et al. | 43/129 |
| 5,669,176 | A | | 9/1997 | Miller | |
| 5,711,955 | A | * | 1/1998 | Karg | 424/409 |
| 5,738,862 | A | * | 4/1998 | Abraham | 424/403 |
| 5,798,385 | A | * | 8/1998 | Marin | 514/512 |
| 5,799,436 | A | | 9/1998 | Nolen et al. | |
| 5,839,221 | A | * | 11/1998 | Ron et al. | 43/132.1 |
| 5,854,284 | A | * | 12/1998 | Abraham | 514/511 |
| 5,975,427 | A | * | 11/1999 | Harries | 239/34 |
| 6,244,518 | B1 | * | 6/2001 | Pogue | 239/36 |
| 6,267,953 | B1 | * | 7/2001 | Bernier et al. | 424/84 |
| 6,289,888 | B1 | | 9/2001 | Welles | |
| 6,296,866 | B2 | * | 10/2001 | Karg | 424/409 |
| 6,362,235 | B1 | | 3/2002 | Nolen et al. | |
| 6,372,242 | B1 | * | 4/2002 | Gutierrez | 424/411 |
| 6,534,079 | B1 | | 3/2003 | Munagavalasa | |
| 6,662,491 | B2 | * | 12/2003 | Flinn et al. | 43/132.1 |
| 7,093,770 | B1 | * | 8/2006 | Moran | 239/36 |
| 2003/0041505 | A1 | * | 3/2003 | Flinn et al. | 43/132.1 |
| 2004/0128902 | A1 | | 7/2004 | Kollars et al. | |
| 2005/0163829 | A1 | * | 7/2005 | Hoenzelaer | 424/448 |

FOREIGN PATENT DOCUMENTS

| | | |
|---|---|---|
| WO | WO 03/031874 | 4/2003 |

OTHER PUBLICATIONS

Gjullin, C.M., Effect of Clothing Color on the Rate of Attack of *Aedes* Mosquitoes, USDA, 1947.*

Brett, G. A., The relative Attractiveness to *Aedes aegypti* of Certain Coloured Cloths, Transactions of the Toryal Society of Tropcial Medicine and Hygiene, vol. XXXII. No. 1. Jun. 1938.*

* cited by examiner

FIG. 1
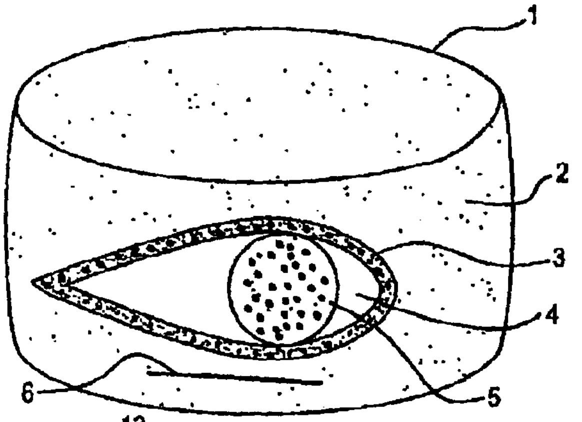
FIG. 1A
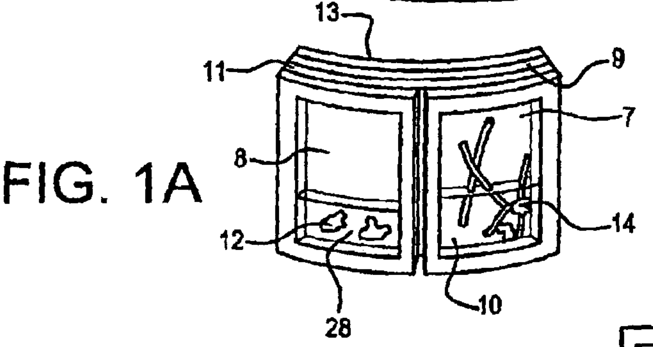
FIG. 2
FIG. 2A
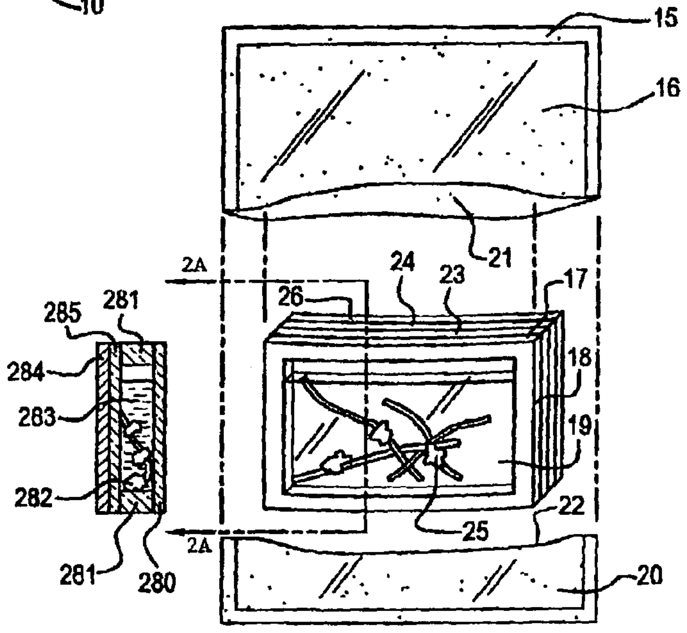

FIG. 10
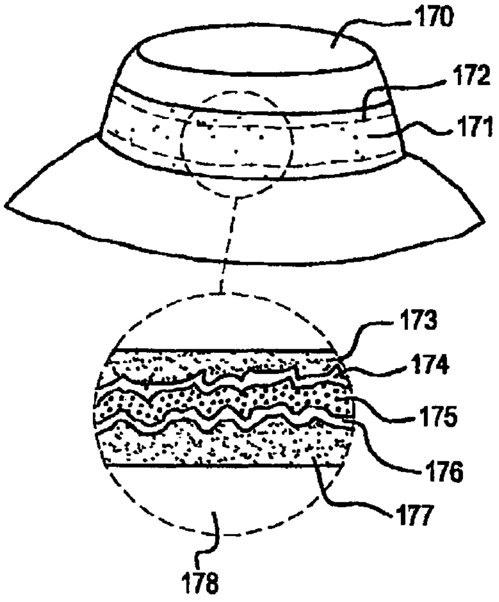
FIG. 10A
FIG. 10B
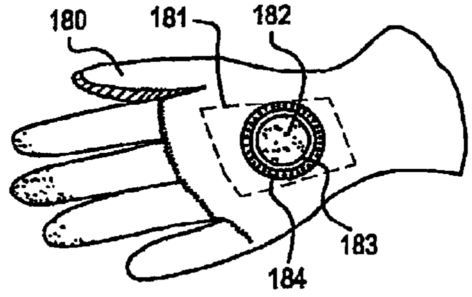
FIG. 11
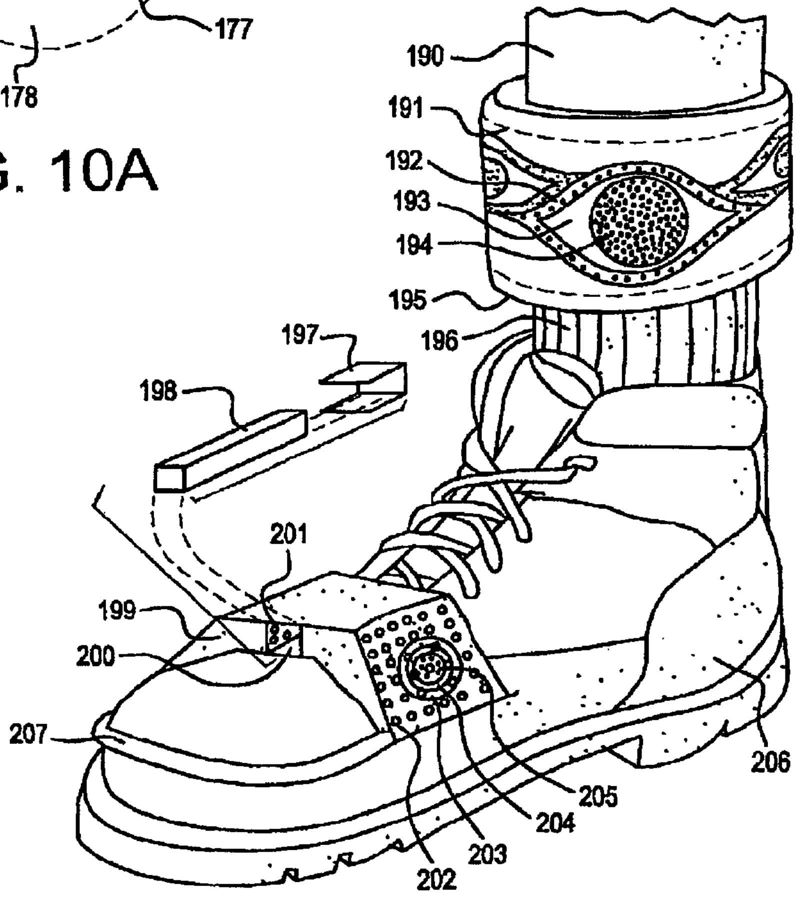

INSECT REPELLENT AND ATTRACTANT AND AUTO-THERMOSTATIC MEMBRANE VAPOR CONTROL DELIVERY SYSTEM

This application claims the benefit of U.S. Provisional Application No. 60/682,293, filed May 18, 2005, which is hereby incorporated by reference in its entirety.

BACKGROUND OF THE INVENTION

To attract, repel, or trap arthropods such as insects, mosquitoes, chiggers, flies, fleas, and ticks, systems typically take advantage of their specific behaviors of search, locate, or avoidance. Mosquitoes in particular have a sophisticated array of means and behavior to locate their prey and avoid hazards.

Mosquitoes can detect distant carbon dioxide emissions and moisture. Over 50 chemicals, such as octanol, and lactic acid, have been identified as attractants to mosquitoes and presumably have been used as chemical signatures of their prey. Mosquitoes can detect the warm surfaces of their prey and can distinguish between cold and hot surfaces and avoid those that are not within typical body temperatures of their prey. They are attracted to contrasting and colored surfaces and are attracted to light, including infrared. It is reported that they are attracted to sounds and motion and will be disturbed by flashes of light, sounds, vibrations, and wind.

Typical mosquito repellents, such as N,N-diethyl-3-methylbenzamide (DEET), in most cases, have been found to simply interfere with the mosquito's sensors impairing their ability to track carbon dioxide and presumably other scents also. There is some evidence that DEET and other chemicals on or absorbed by the skin kill parasites that have been injected by the insects or arthropods. But ultimately DEET, on the skin and sound repellents have not prevented some of the insects from finding skin and subsequently stinging. When DEET is applied to the skin between 5.6% and 15% will be absorbed through the skin and into the blood stream of the user.

The effects of repellents are generally to act as an anesthetic; they should not be ingested or applied to open wounds and in excessive cases, topical application has lead to death.

SUMMARY OF INVENTION

The above patents are incorporated herein by references in each of their entireties, and particularly, Hockaday PCT patent application WO 03/031874 A1 "Membrane Catalytic Heater" is incorporated herein by references in its entirety.

Mosquito Behavior

Mosquitoes have the behavior of feeding within certain temperature ranges, low wind conditions, and at dawn and dusk. They will avoid smoke of fires and intensely hot surfaces, ignore cold surfaces and will ignore a variety of chemicals that are typically emitted by vegetation such as methanol.

I have found in my research that mosquitoes are still able to track and locate a human which has a fresh coating of DEET mosquito repellent on his skin, although at a reduced rate. I have found that with repellant ampoules the mosquitoes had the surprising behavior of flying straight toward the repellent ampoule and landing on the area between a red, yellow, and black cloth surface. This suggested that the mosquitoes, once they are close to the prey, are not using the carbon dioxide emission and chemical scents to track the prey, but are using infrared and visible light to close in on their prey.

An explanation of this behavior may be that in their environment the principal preys of mosquitoes are feathered birds and furry mammals. The principal area where skin is usually exposed and is available to mosquitoes to penetrate to blood vessels near the nose and around the eyes, since the rest of the body is covered in feathers and fir, plates, or thick skin. The edge of the eyes are a particularly attractive target because the nose area can be surrounded by thick skin and the action of breathing can disturb landing and even suck in the insects. The center of the eye is unsuitable due to the lack of blood vessels and the rapid response of the eyelids should push the insects off the eye. Therefore I expect that insects that seek blood will target the border between the eye and the fir or feathers, what is usually called pink tissue. Thus I expect efficient blood seeking insects to home in on the edges of the eyes.

The eyes of animals also distinctly stand out in the environment. The eyes are near the body temperature of the animal, are wet, and have a dark center, a colored iris, a white perimeter, and then have colored or pink eyelids or edges, which are then surrounded by fur, scales, or feathers. The eyes are expected to emit an infrared light spectrum typical of water, or blood at about 36° C., and many of the chemicals traces of the animal are emitted through the thin skin or membranes. Eyes also periodically move. This motion may also provide a distinct visual signature of the prey to the mosquito. The invention uses this expected targeting behavior to eyes by having an attraction decoy target that looks like or has features of an eye.

Mosquito Targeting Sequence

An expected mosquito targeting sequence is to initially activate when elevated carbon dioxide or chemical scents are detected, and to fly toward the concentration gradient plume of chemical traces. Periodic puffs of carbon dioxide and metabolic chemicals may further confirm the target is an animal rather than a plant. At closer range when the eyes or infrared sensors of the insect detect an eye or surface in the proper temperature range and emission, the mosquitos fly toward it. Some surfaces may be animal body temperatures but are not emitting a light spectrum of a wetted surface that is characteristic of the eye such as metal surfaces and non-living objects. Use the sound of other female mosquitoes flying near the prey at 500 Hertz to help locate the prey. As approach is made toward the eye, the mosquitos move toward the edges and in particular the contrast color perimeter area and the pink tissue.

The optical resolution of the insects eyes and infrared structure, due to the small size and faceted nature, and long wavelength light, and are expected to only allow close range use, but will allow the insect to lock onto a small specific target area in close range compared to the chemical traces such as lactic acid from the whole animal's skin and exhalations. Avoiding and flying away from sudden airflow, this behavior could be a desirable survival instinct because if the located target is the nose of an animal, being sucked in is fatal. As contact descent is made on the pink tissue, chemical traces such as lactic acid should increase confirming the target. Motion is expected from the eye and blood circulation vibrations to further confirm this is a live animal. Mosquitoes avoid the rapid motions of the eye opening and closing. They repeat the approach until stable pink tissue has been landed upon where upon proboscis is inserted and blood drawn. The blinking of the eye will only cause minor flying avoidance, flying only high enough to avoid eyelashes and not far enough to stray into the nostrils or loose the eye target.

Mosquito Attraction Innovation

One of the innovations of this invention is to create a decoy for the mosquitoes to land on if they are in close range, emit sufficient sensor jamming chemicals to block the mosquito's chemical sensors such that they will have only visual cues and ineffectually land on the decoy instead of the human skin. The decoy could also kill the mosquitoes such as with an electrical pulse, laser light pulse, contact insecticides, insecticides inside membranes, vaporized insecticides, or a trap. The mosquito obtains the maximum dose of sensor jamming chemicals, or poisons, by approaching and landing on or drawing fluid out of the decoy. Bacteria or viruses harmful to just the mosquitoes could be delivered with decoy contact.

A flash of light could also be used to overload the light sensor system of the mosquito, hopefully blinding the insect and/or causing them to fly away from the target and also preventing them from making return visual attacks. It may be possible to interfere with the insect insertion mechanism by coating or filling the decoy target with a chemical that can interfere with the proboscis or digestive system of the insects. The chemical blocking strategy, when the insect is close, is usually insufficient to divert them from reaching the prey.

It may also be necessary, to be effective, to disturb the mosquitoes sufficiently and periodically so that they will fly far enough away so that they will be unable to use visual cues to find alternate victims. This can be done with puffs of air and flashes of light or sound. Killing the mosquito can be accomplished by puffs of insecticide, surface coatings of insecticide, such as pyrethrum, permethrin, a sticky entrapping surface, an electrical pulse, or insecticide inside an ampoule.

Rather than allow the mosquito to repeatably attack the decoy and possibly then also attack the human as a secondary target, a strategy might be to deliver a chemical to satisfy their appetite, or simulate sudden motion of the victim to move the mosquito away. Examples of these are citronella, glucose (appetite affectors), sound bursts, puffs of air, and small flashes of light. It may be possible that an intense infrared light flash might overload their light sensors to temporarily or permanently blind the mosquitoes.

A light flash might be able to convince mosquitoes momentarily that it is midday and to stop their hunting behavior. It should be mentioned that along with sensor jamming and decoy devices it would help if the user wears dry clothes that have low emissivity to be less attractive and not to have the infrared signature of a wet surface, to help make the decoy the more attractive target.

From the literature search, DEET, currently the most effective sensor jamming chemical, has not been shown to be harmful to the human body when used topically and periodically, but typically 6-15% is absorbed through the skin when applied on the skin. It is recommended to use lower concentrations on children's skin. The highest dose of DEET will remain on the skin for roughly 8 hours. This means an application of the most concentrated DEET sold must be applied every 8 hours for continuous performance. DEET can also be washed off. For lesser concentrations its use is more frequent.

The application of DEET does not repel mosquitoes, it simply interferes with their chemical sensors, so it does not prevent the mosquitoes in the closest proximity from finding a host without the chemical clues. The repellent ampoule can also contain a fuel to make carbon dioxide through combustion or a fuel cell. Electrical power can be produced by the combustion driving a heat engine, thermoelectric device or electrochemically with a fuel cell to be used to drive electronics, mechanical devices, and fans. The electronics could also drive a light source, and/or sound sources to attract, disturb, or repel insects. The fans and mechanical devices can be used to trap the mosquitoes. There could be many other means of powering electronics such as batteries, utility electricity, solar cells, and windmills.

This invention can be a wrist, ankle, hat, or neck strap, separate or as part of the clothing. Other systems can be stand-alone attractors, traps and general mosquito disabling systems at the perimeter of the desired clear areas. The stand-alone systems can use a variety of heat and carbon dioxide sources, including catalytic heaters, batteries, electric heaters, fuel cells, and solar light warmed surfaces and solar warmed thermal masses.

This invention uses a permeable membrane containment of insect attractants and/or sensor interfering compounds, combined with any number of colored surfaces, infrared emitting surfaces, light and contrasting surfaces and body heat or heater to form a sting defeating system. The membrane containment can have a permeable wall facing the outside air and an impermeable membrane facing the body, keeping chemicals from going into the skin or to the interior of the system.

A variety of technologies can be integrated with this system including catalytic heaters, fuel cells, thermoelectrics, batteries, electronic sensors, traps, fans, chemical luminescent light sources, light emitting diodes, and sound generators. The membrane can also be selectively permeable to permit emitted chemicals to diffuse out and can have a reduced water incoming diffusion to maintain a steady delivery even in a very humid environment.

A water-absorbing chemical that does not diffuse through the membrane and is insoluble in the emitted chemicals can act to maintain the vapor pressure of the emitted chemicals by capturing the water that does diffuse through the membrane. This membrane delivery of chemicals can be used to deliver fuels to a catalytic heater and to generate carbon dioxide and maintain the heater within the insect attractive temperature.

Control of the fuel contact with the membrane with active controls, such as with a pump or by allowing the boiling of the fuel to push the fuel away from the membranes surface, can be used to control the catalytic heaters temperatures. It is possible to have membranes that reduce their permeability of fuel at higher temperatures creating a temperature regulating mechanism.

I have found that the delivery of repellents through membranes will track the vapor pressure of the chemicals, and rises exponentially with temperature which can lead to excessive delivery of repellents at high temperatures and ineffective delivery rates at low temperatures. Thus, it is important to regulate the temperature or the diffusion rate of the ampoule at different temperatures to provide an optimum delivery of repellents or attractants, besides also being an infrared attractive target for insects.

This invention also adds a material that has a low diffusion rate through the membrane into the ampoule. When the ampoule goes above a certain temperature, it releases water or a chemical that reduces the vapor pressure of the diffusing chemicals. Another effect of the released chemical, such as water, can also deliver a vapor through the membrane that acts as a retardant to the catalytic utilization of the fuel chemicals. This mechanism can be used to moderate the delivery of chemicals over a wide range of temperatures, or can act as temperature regulated fuel delivery to a chemical reaction, catalytic heater, or fuel cell.

The chemical additive that regulates the chemical vapor pressure can also serve the function of a chemical vapor pressure maintainer at low temperatures by absorbing impurities that can diffuse though the membrane, such as water. An example of this temperature chemical regulating system is to add sodium sulfate hydrate (Glabers salt) to methanol fuel with DEET in a silicone rubber ampoule. When the temperature of the ampoule goes above 32.3° C. the de-hydration of the salt will occur. This dehydration absorbs heat energy and the released water will dissolve into the methanol and DEET, reducing the vapor pressure of the methanol and DEET.

The initial effect is to create an isothermal condition in the fuel as the salts absorb energy, which can be useful in holding a constant temperature for a while in passive body heated or solar heated systems. The reduction of the vapor pressure throttles the fuel to the catalytic heater reducing heat output and creating a dynamic equilibrium between the fuel delivery and heater output, resulting in an auto thermostatic system. At low temperatures if the sodium sulfate is not fully hydrated it can absorb water that can diffuse into the ampoule and reduce the vapor pressure of the diffusing chemicals, thereby maintaining a high delivery rate at low temperatures.

This auto-thermostatic system can be used in practical thermostatic heater devices where local spatial control of a distributed heater is important and where simplicity of operation and construction is needed. Examples of these kinds of devices are personal heaters on people, insect attraction systems on or off the body, large area heaters, fuel cells, and machinery heaters, food heaters, food defrosting heaters, anti freezing heaters for materials and structures, and heaters for materials and structures.

The fluid diffusion reduction or stabilizing of this system at higher temperatures can be used in systems where steady delivery of a chemical without heating is needed even though the system is operating over a range of temperatures. Examples of non-heated steady delivery applications are passive mosquito repellent delivery and passive transdermal patch drug delivery on arms and legs and off the body.

This patent adds new features upon a co-pending application referred to as Membrane Catalytic Heater (PCT Patent application number WO 03/031874 and provisional patent application No. 60/327,310, both of which are incorporated herein by reference in their entireties) in which fuel vapor and air (or other means of oxygen supply) are supplied to a catalyst. The catalyst promotes the flameless combustion of the fuel, releasing heat. The liquid fuel is supplied through the use of a selectively permeable membrane, such that only the fuel vapors diffuse through the membrane and are fed to the catalyst. The catalyst is placed on a support, and both the catalyst and the support rest on a porous material.

Alternatively, the catalyst may be supported by the selectively permeable membrane. The supply of fuel to the selectively permeable membrane and the exact identity of the membrane serve as a way to regulate the degree of heating provided by the catalytic heater. The selective molecular filtration of the fuel through the membrane keeps the catalytic heater from being contaminated from impurities in fuel, such as salts. The selective permeability of the membrane to fuel such as methanol and not the product water reduces the fuel contaminated with back diffusion of product water and maintains the fuel concentration subsequently at a steady rate of fuel delivery.

Another feature of the membrane catalytic heater invention is an additional coating, which protects the combustion catalyst from contamination. It also serves the purpose of adhering the catalyst powders to the substrate on which they are supported. The coating also has certain permeability to the fuel and the products of the combustion reaction. This coating can also serve the purpose of limiting the catalytic combustion rate and therefore serves as yet another regulating mechanism in the invention. The coating also protects the catalytic surfaces from contamination and can enhance the catalytic effects. The coating can also have an affinity for the fuel and oxidizer and products to increase the effectiveness of the fuel.

The catalytic heater can be incorporated into a system for various applications. One of the unique features of using a liquid fuel with the selectively permeable membrane in proximity to the catalytic heater is that when the fuel reaches its boiling point it removes fuel by boiling away from the catalytic reaction site and subsequently limits the maximum temperature. The vaporized fuel can be condensed in a heat exchanger and can deliver the thermal output of the heater efficiently. This fuel boiling mechanism along with the back diffusion of carbon dioxide and nitrogen can also be used to keep the fuel homogenous and self purging. By keeping the fuel homogenous and not in direct contact with catalysts, the heater can easily be purged of fuel contamination by draining the fuel.

Critical New Features Include, but are not Limited to, the Following:

1. Permeable membrane containing the chemical emission chemicals.
2. An additive to the contained chemicals to moderate or reduce the vapor pressures with higher temperatures or maintains a high vapor pressure at low temperatures.
3. An impermeable membrane containing the permeable membrane chemicals.
4. An impermeable barrier between the diffusion ampoule and human to reduce contact with the insect interfering chemicals.
5. Catalytic heaters.
6. Insect sensor jamming chemicals in the ampoules.
7. Insect attraction chemicals in the ampoules.
8. Insect sensor jamming and attraction chemicals in the ampoules.
9. Insect distracting or repelling mechanism in the ampoules.
10. Insect killing, infecting, vaccinating, satisfying, or disabling chemicals in the ampoules.
11. Images of eyes and colors and patterns typical of insect prey.
12. An infrared heat emission pattern typical of the insects' prey use to attract insects.
13. Incorporating insect attracting, distracting, blinding, or repelling light systems such as a flashing infrared light.
14. Incorporating insect attracting or disturbing sounds.

These and further and other objects and features of the invention are apparent in the disclosure, which includes the above and ongoing written description with the drawings and the claims.

BRIEF DESCRIPTION OF THE DRAWINGS

FIG. 1. Eye image cloth wristband with a dual insertable repellent scent ampoule.

FIG. 1A is a detail of the insertable repellent scent ampoule for use in the wristband shown in FIG. 1.

FIG. 2. Chemical diffusion ampoule and sealed packet.

FIG. 2A is a cross section of the chemical diffusion ampoule and sealed packet taken along line 2A-2A of FIG. 2.

FIG. 10 shows a hat with insect repellent, insect confusion, or insect attraction band.

FIG. 10A is an enlarged view of the band color pattern on the hat band shown in FIG. 10.

FIG. 10B Glove with repellent ampoule and visual decoy.

FIG. 11 Shoe heater and ankle band.

DETAILED DESCRIPTION OF PREFERRED EMBODIMENTS

Figure 3A:
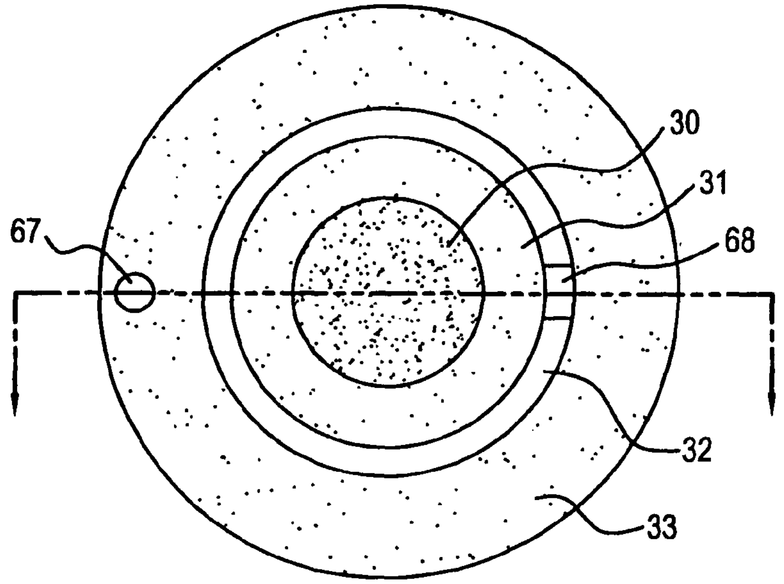
FIG. 3A Fan driven mosquito trap system top view of heated spot.

In FIG. 1 a view of the cloth wrist or ankle band 1 with the repellent ampoule 7 shown removed from the interior of the wristband 1. The band 1 is made with cotton, Cool Max® polyester fabric, silk, or an elastic weave Nylon fabric (texollini, 2575 El Presidio St., Long Beach, Calif. 90810). The band 1 is cut and sewn in the form of a circular tube with an interior volume (pocket) 6. The pocket 6 in the band can have sewn restrictions to contain the rubber ampoules 7, 8 just under the eye pattern 3. Access to the pocket is provided by a slit opening 6 which is shown on the outer surface of the band. The slit opening 6 can also be placed on the interior of the band 1.

An eye like pattern is inked on the band 3, 4, 5. Features of the eye are a dark central area 5 colored black simulating a pupil. It may also be effective to simply have a round hole viewing the underlying ampoule being colored black. The pocket can also be lined or made with a membrane or fabric that has low permeability or is impermeable to the chemicals to be delivered to achieve directed chemical diffusion out through the eye pattern of permeable or open holes in the fabric. The pocket also provides a homoginizing cavity to mix the two the different scents from the two ampoules 8,7 in this example. This hole pattern scheme also has the feature that the surface of the ampoules 7, 8 are expected to be hotter then the outer fabric surfaces by closer contact to the skin and a good thermal conductor of the users heat and thereby simulate the thermal characteristics of an eye more effectively.

Around or adjacent to the black spot 5 is a printed yellow or white area 4. This simulates iris and the conjunctiva “white” of the eye. Surrounding the yellow or white area 4 is a rim pattern of pink, red, or magenta 3. This simulates the eyelids and surrounding exposed thin skin near the eye of an animal. The remainder of the band 2 is fabric dyed with light colors such as light brown simulating the lower emissivity of the remainder of the animal that is fur or plate covered. These colors of the patterns that were chosen to simulate the emissivity surfaces of typical prey of mosquitoes. Other more abstract patterns have been used effectively with similar adjacent colored areas shown in FIG. 5.

It is also desirable to match the colored areas 3, 4, 5 with the infrared spectrum that mosquitoes also utilize in identifying prey. In particular the entire eye area 3,4,5 ideally would emit an infrared spectrum matching that of a moist eye, which is dominated by water. Thus a water retaining material such as cotton fibers, cotton cloth, or hydrogel could be incorporated into the pattern.

The repellent ampoules 7, 8 shown in FIG. 1 are made with two silicone rubber sheets 7,8 from Specialty Silicone Fabricators Inc., 3077 Rollie Gates Dr., Paso Robles, Calif. 93446, the thickness and composition of each can be adjusted to have the two ampoules, in this example, deliver a constant ratio of attraction, interference, and satiation chemical fluids. Many ampoules with volume, surface area, membrane material and thickness can be used to deliver targeted chemical fluid (gases or liquids) ratios. It is anticipated the customer preferences for particular odors can be accommodated by the user selecting from a range of perfume loaded ampoules.

A back silicone rubber sheet 0.5-mm thick 9 and a 25-micron thick aluminum foil sheet 13 are cut out. The high permeability sheet 7 and the low permeability sheet 8 of silicone membrane and a spacer frame of silicone rubber 11 are cut out. A back wall consisting of an aluminum foil sheet 13 glued to a silicone rubber membrane 9 is glued together with silicone sealant. The outer sheets 7,8, frame 11 and back sheet 9,13 are silicone sealant glued along the frame 11 to form the hollow cavity ampoule, along with a suspension agent such as fumed silica, dry crystals or anhydrous sodium sulfate 12,14. The curing of the silicone sealant can occur in a humidified atmosphere above 33 C to allow the silicone sealant to cure, while preventing the sodium sulfate 12 from hydrating.

Alternatively the sodium sulfate and fumed silica 12 can be obtained in a fine powder form and injected as slurry with the fluids 10, 28 after the silicone ampoule is formed. Once the silicone sealant is fully cured the ampoule is filled by a needle injection from a syringe with DEET liquid, and attractants such as folic acid, citronella, and octanol and perfumes 10. The second ampoule can be designed with a thicker or composite membrane 8 for the high volatility liquids such as acetone, methanol, and ethanol 28.

The silicone rubber 7,8,11 has a high diffusion permeability and chemical resistance for the DEET, octanol, folic acid, methanol, ethanol and acetone while having a low permeability for the sodium sulfate. The rubber ampoule 7,8 is then inserted into the band 1 by folding the rubber ampoule 7,8 and stretching the elastic fabric of the pocket opening 6 with the aluminum foil side 13 facing the interior of the band 1. The rubber ampoule 7,8 is then unfolded and held in the square pocket 6 in the wristband 1 underneath the eye pattern 3,4,5.

The assembled bands 1 can then be worn on the wrists, ankles, arms, forehead, and neck and on hats. It could also be configured to have an adhesive underside coating and be worn like a bandage. They can also be placed on animals. They may also be placed on warm objects. These bands 1 are expected to act as sweat bands and wick sweat toward the more water retaining patterned area of the band. This effectively can add the user's scents to the decoy eye pattern area of the band. The expected behavior of female mosquitoes is to be attracted first by the carbon dioxide emissions and scents of the user and the ampoule. The mosquito will also be encountering the low volatility compound 10 and the high volatility compounds 28 emissions from the ampoules 7,8 that is warmed by it's placement on the body of the user.

Initially the scents are designed to attract the mosquitoes preferentially to the band 1. When the mosquito is nearing contact the DEET will interfere with the chemical sensors of the mosquito and they will use only infrared and visual cues. If she is close enough, within roughly three meters, she will be attracted to the dark pupil pattern 5 and infrared emissions on the band 1 and at close range land on the border area 3 of red or pink and the white area 4 of the decoy. If not close enough for visual cues she may then wander off with some dose of DEET to hamper her long-range ability to find prey. By landing on the decoy 3,4,5 the Mosquito will obtain a high concentration of DEET vapor disabling and interfering with her chemical sensors.

Chemicals such as citronella may confuse the mosquito's appetite. We have observed mosquitoes repeatably attacking the decoy 3,4,5 when only DEET was used. If the user moves or brushes the mosquito away this may be sufficient to put them far enough away from visual cues to attack again, reducing the chances that she will be able to find an authentic victim. The ampoules 7, 8 can be designed with a desired diffusion delivery rate of DEET and scents 10, 28 in sufficient volume to effectively deliver a steady chemical vapor for days.

The aluminum foil wall 13 of silicone rubber ampoule 7 blocks direct contact to the user with the DEET and other scents 10, 28. This reduces the amount of DEET and scents 10, 28 absorbed by the user. By wetting the band 1 with water or sweat from the user it is expected to increase the attractiveness of the decoy pattern 3,4,5.

In FIG. 2 a diffusion ampoule 18 and the surrounding impermeable package 15 are shown. The diffusion ampoule 18 consists of a silicone rubber membrane 17, silicone frame 23, back silicone rubber wall 24, and an aluminum foil backing foil 26 glued together with silicone rubber sealant. Inside the diffusion ampoule 18 are sodium sulfate crystals 25, diatomaceous earth or fumed silica 19. Diatomaceous earth, jelling materials, cotton fibers, or fumed silica can be added to the DEET and salt hydrate mixture 25, 19 to maintain contact with the membrane as well as to keep the salt hydrate suspended and to avoid a settling out behavior that can occur because of the higher density of the salt crystals from the DEET and change in dimensions from hydration to dehydration. If the sodium sulfate is to be used as a temperature regulating system with the catalytic heaters or fuel cells, the sodium sulfate 25 is hydrated.

An impermeable package made from two sheets of aluminum foil 16 coated with urethane and polypropylene is heat sealed 15 around the diffusion ampoule 18. The diffusion ampoule 18 is filled with DEET, attraction compounds 19, such as lactic acid, and octanol, and sodium sulfate hydrate 25 through a syringe. In FIG. 2 the impermeable package 16,20 is shown torn open 21, 22 to remove the diffusion ampoule 18 to be placed in the mosquito band, trap, or interference device.

In FIG. 2 a cross-sectional view of the ampoule is shown. The outer silicone membrane 280 is glued or heat-sealed to a frame 281 and a back wall 285. A back wall membrane of impermeable material 284 such as aluminum foil is glued to the back silicone rubber wall 285. The impermeable membrane 284 may be wrapped around the edges of the frame 281, (not shown for simplicity) and around some of the front membrane 280 in products to minimize diffusion of chemicals to the skin of the user.

In FIG. 3A a mosquito trap that uses a catalytic heater and fuel cell and air fan is shown viewing the simulated eye. The simulated eye consists of the central black infrared emission spot 30 that could have a coating or could be made of a material that retains water such as sodium chloride, sugar, or solid polymer electrolyte (Nafion). The eye spot 30 is painted onto a ceramic, aluminum or stainless steel metal cylinder that holds the catalytic burner and a fuel cell. Surrounding the black eye spot 30 is the simulated iris 31 and conjunctiva "white" of the eye formed by painting the edge of the cylinder with a yellow or white paint, and a material that retains water or has a infrared emission similar to water, such as titanium dioxide, solid polymer electrolyte such as perfluorosulfonic (Nafion®) or sulfinated butyl rubber and polystyrene (DAIS).

It is possible that a permeable ampoule of saline solution and attractive chemicals that match both the electromagnetic and chemical emission of the eyes and skin of animals could be located on, or near the simulated eye. It may be feasible that the attraction ampoule and the fuel ampoule could be the same ampoule or use two different membranes to deliver appropriate chemicals to attract mosquitoes on one side and fuel the catalytic heater and fuel cell on the other side.

Another possible delivery arrangement is to deliver methanol fuel through a silicone membrane capillary tube passing by the catalytic heater and fuel cell, while preferentially accumulating and retaining water and the larger scent molecules such octanol, lactic acid and DEET. Then the remaining fluid depleted of methanol flows into or onto a porous evaporation surface of porous alumina with 0.5 microns to 1.3 micron pores of the eye simulator 30 through a small capillary tube vent (10 cm long 125 micron inside diameter stainless steel tube or through a permeable membrane (500 micron thick silicone rubber membrane, or 25 micron Urethane rubber membrane).

Surrounding the simulated iris 30 and conjunctiva 31 is the throat of the air intake, where the inner walls and the outer walls of the flow tube 32 are coated red or pink, and which has a coating with a infrared emission similar to blood and which retains water, such as Nafion. Outside the throat area is the outer housing 33 and airflow ducting cylinder. This can be made of painted steel with a tan or brown coating to simulate the color of an animals body. A vent 67 for carbon dioxide and scents is used to ensure that sufficient chemical scents are emitted by the trap's recirculation flow. The fresh air intake channel 68 shown crossing the throat 32 brings fresh air into the center of the trap and the fuel cell array.

In operation the central black spot 30 is heated to between 25° C. and 42° C., with a thermostatic temperature target of 36° C. controlled by the fuel distribution bladder or ampoule and catalytic burner and fuel cell. The heat is transferred through the metal central cylinder and the fuel distribution bladder or ampoule. The central spot 30 provides the distinct visual and infrared target for mosquitoes, while the catalytic heater and fuel cells provide the heat to warm the central spot to the needed temperature. The vent hole 67 insures that a fraction of the re-circulated carbon dioxide and scent loaded gas flow of the trap is emitted near the entrance of the trap.

Figure 3B:
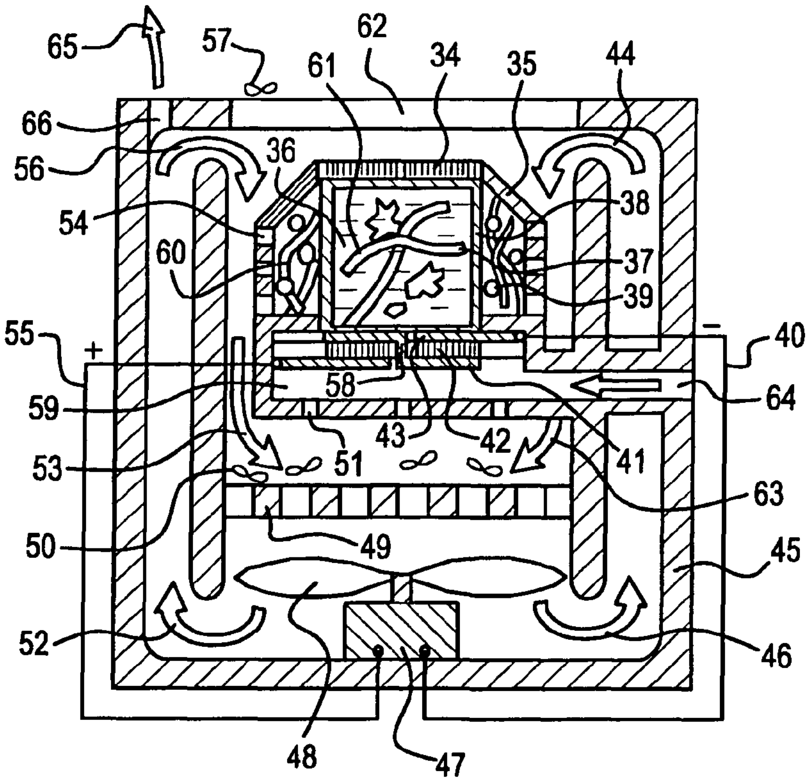
FIG. 3B Fan driven mosquito trap system side view cross-section.

In FIG. 3B a side cross sectional view through the insect trap is shown. The central spot 34 is shown as a solid plate, made of metal such as aluminum, coated with various coatings mentioned in FIG. 3A, but it could be permeable silicone rubber, urethane, or porous ceramic or cloth to allow scents and water to permeate its surface to produce anattractive target for the insects.

Behind the central spot 34 is the fuel ampoule 38. This is shown as a single bladder filled with fluids such as methanol, acetone, folic acid, octanol, DEET, fumed silica 36 and Sodium sulfate hydrate 37. Diatomaceous earth, cotton fibers 61, jelling materials, or fumed silica can be added to the fuel and salt hydrate mixture 36 to maintain contact with the membrane 38 as well as to keep the salt hydrate 37 suspended and avoid a settling out behavior that can occur because of its higher density from the fuel and salt crystals and change in dimensions from hydration to dehydration.

The fuel ampoule 38 could be designed in many forms from insertable ampoules to capillary tubes that are filled from a larger pressurized reservoir. Surrounded on the sides of the fuel ampoule is a bed of alumina beads 39 coated with 1% platinum (Englehard, Chemical Catalyst Group, 554 Englehard Dr., Seneca, S.C., 29678), and alumina silicate fibers 60 coated with platinum (Infragas S. p. A., via Lavoresco, 10-10072 Caselle, (TO) Italy).

Enclosing the bed of catalysts 39 is a concentric perforated aluminum cylinder 54. The outer surface of the perforated aluminum cylinder 54 is coated with a red coating to match the infrared and visual electromagnetic emission of shallow surface blood vessels of skin and eyelids. The catalytic heater 39, 60, 54 catalytically combusts the methanol as it diffuses through the ampoule membranes 38 to the catalytic sites 39, 60 with oxygen which is diffusing from the air flowing 44, 56 past the heater.

Adjacent to the fuel ampoule 38 is a fuel cell or thermopile 58, 43, 42, 41,59. Fresh air is drawn in from the outside air through a flow channel 64 to the fuel cell array or thermopile 58, 43, 42, 41,59. If a thermopile is used, the air flow channel 64 could be substituted with a heat pipe with a heat fins heat radiator on the outside of the trap. The fuel cell would use the methanol fuel from the ampoule 38 and diffusing oxygen in a filtered manifold 51,59 to convert the energy in the methanol to electricity and heat. Carbon dioxide and water products of the fuel cell will diffuse away from the fuel cell 58, 43, 42, 41,59 into the air flow 53, 63.

If a thermopile is used instead of a fuel cell, the thermopile is heat sinked to the flowing air 53, 63, and the heat is moved from the catalytic heater into the air 53, 63 flows. Other possible energy conversion devices that could be used are a heat engine coupled to a fan or a heat engine coupled to an electric generator. Photovoltaic cells and batteries can also be the source of electric power as well as utility generated electricity.

Outside of the fuel cell is a perforated plate 51 with a porous polyethylene non-woven sheet to filter the air supply. Electrical connections 55,40 to the fuel cell or thermopile go to the fan 47,48. A battery or electrical storage device and appropriate flap valves to keep the insects in the trap may be used to operate the trap only during insect feeding times. Electronics that sense desirable operating times can control fuel valves or pumps for fuel, turn off and on fans and run attraction lights, vibrations, and sound devices, or even devices to indicate the trap is full or needs servicing could be used.

The fan 47,48 is shown located behind the insect screen 49. It should be mentioned that also unsteady or periodic airflow of various fans and means could be used effectively to capture the mosquitoes. The periodic carbon dioxide and scent laden airflows 65 from the vent 66 and vibrations may also be attractive to insects because this matches the breathing of typical prey.

In this trap, filters 49 similar to plankton net cones could be used to move bodies of insects 50 gradually down the filter to keep the net clear of insects and to permit easy disposal of bodies out through an outlet jar, drawer or exit could be used. The fan 47,48 is placed after the net 49 to avoid fouling from the bodies of the insects 50. The airflow 53,63,46,52 is drawn through the screen by the fan and is ducted through the outer and inner duct plenum 56,44 up to the entrance of the trap 62. The objective of recirculating the airflow is to increase the efficiency of the air flow by using the same air flow's kinetic energy rather than exhausting the air and to make the emissions of the attractant come from the entrance of the trap 62 where the insects are to be attracted. This recirculated air is also conserving heat energy by avoiding heating cool air and then exhausting warm air. The recirculated air 44,56,46,56 will have a higher temperature and, concentration of carbon dioxide, water, and scents and higher air flow as compared to a system of the same output that is not re-circulated.

A fraction 65 of the recirculated air 44,56 either by random fluctuations, diffusion, or purposely diverted through the vent 66 at the entrance of the trap 62 is released to the surrounding air. It is important not to allow the carbon dioxide levels go above 4.7%, typical of animal breath, because at higher concentrations carbon dioxide can act as anesthetic to the mosquitoes, and they may avoid the trap.

At the entrance of the trap 62 the airflow 44,56 is directed by the outer flow housing 45 to the annular entrance 62 around the target 34,35,54. This airflow pattern 44,56 at the entrance 62 can be arranged with the geometry and size of the outer housing inner flow housing and the target geometry to create a trapping air flow as the insects are attracted to the red perimeter 54 of the target 34,35. The airflow 44,56 may need to accelerate very gradually and radially from the center of the target 34 because some insects such as mosquitoes will avoid high air flow and airflow gradients.

The mosquitoes instinct may betray them, because to escape high winds the mosquitoes should fly down or away from the typical flow gradient, perpendicular to the flow direction. Thus, if the trap is oriented as shown with the target 34 horizontal on the top or the target vertical, the mosquitoes 57 may fly into the opposite trapping 44, air flow 56, or further into the trap.

Once the insects reach the red annular air flow entrance 54 the air flow 56,44,53 should be high enough, roughly above 5 miles per hour to not enable the mosquitoes 57 to fly fast enough to escape the trap. The insects are carried by the rapid airflow 56,44, in annular entrance nozzle 54 past the heater 54,39,60 and fuel cell 41,42,43,58 into the filter area 49. The filter 49 is made with a screen mesh small enough that mosquitoes cannot go though the mesh. The filter 49 as mentioned earlier could be a cone shape and vertically oriented to gradually accumulate the insects to the apex of the cone, where a jar or drawer can be located to be periodically emptied.

Figure 4A:
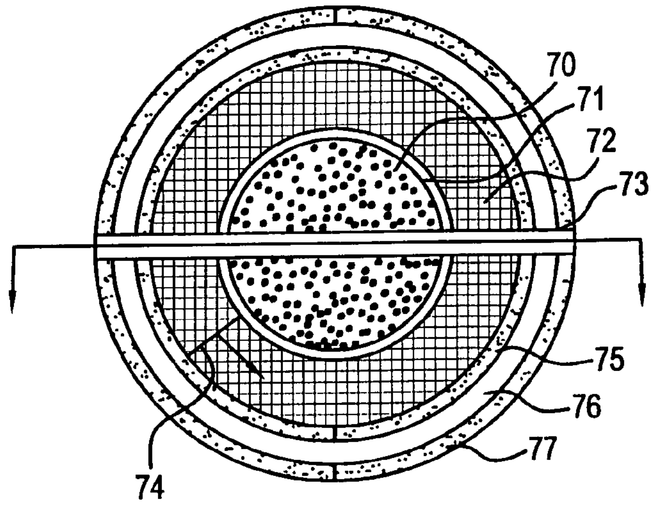
FIG. 4A Rotating helical mesh trap top view of heated spot.

In FIG. 4A an insect trap with a rotating mesh helix 72 is shown. Non-mesh helixes can be used, except that the air will be required to flow through and exit at the bottom of the trap. In this drawing the visual attraction target is a central circular disk 70 that is black colored, and the coating attempts to match the emissivity of moist animal tissue. Surrounding the central circular disk 70 is a light colored rim 71, such as white or yellow colored, and then the surface of the heater and the helical mesh 72 which is colored pink or red. Outside of the helical mesh 72 are the sidewalls of the helix 75 colored a non-insect-attractive color such as and tan or brown. Outside of the helix sidewalls 75 are a flow plenum 76 and the exterior case cylinder 77.

One option is to have simply a hole or permeability to the central circular disk 70 that reveals the surface of the ampoule, that has a permeable membrane, that is emitting the insect attractants such as lactic acid, octonal, carbon dioxide, and water. Above the attraction target 70 is the support frame 73, which also serves as an insect viewing shield of the helix 72. When the trap is operated and the insects are near the target, the leading edge of the helix 74 will not be visible to the insect for half of the rotation. Thus the rotation of the helix achieves a mechanical action of a mesh door that quickly closes and gradually advances into the trap.

Figure 4B:
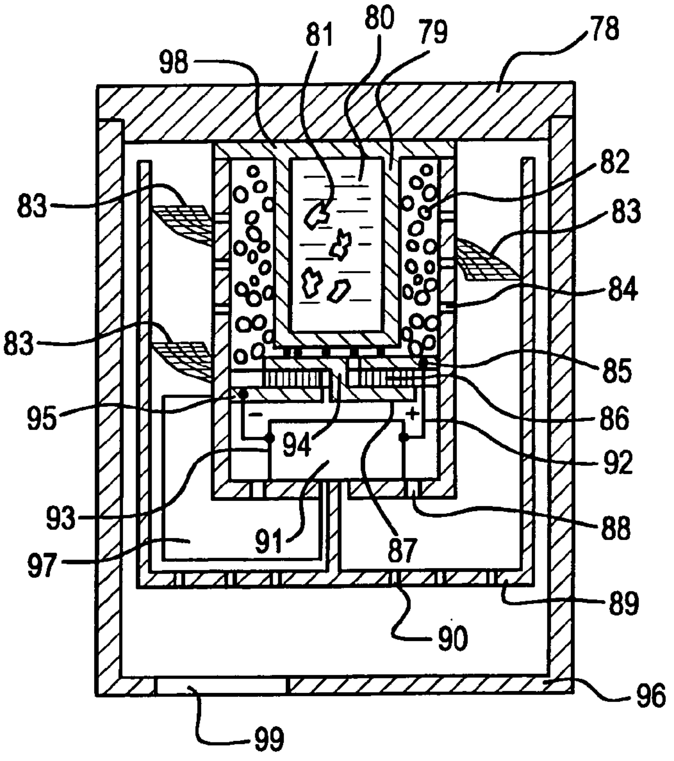
FIG. 4B Rotating helical mesh trap side cross-sectional view.

In FIG. 4B a side cross-sectional view of the trap is shown. The central circular disk 98 is shown in cross section with a cylindrical permeable ampoule of fuel and chemical compounds 79,80,81 to attract and interfere with insects. The ampoule walls 79 are made of a permeable material such as a 20% porosity 0.5 micron pore diameter alumina cylinder 5 mm thick with or 1000-mm thick silicone rubber. A silicone rubber film 50 microns thick coating can also be bonded and supported on the outside of the alumina cylinder 79.

The cylindrical ampoule is filled with fuel, suspension materials, scents, and salts, such methanol, fumed silica, octanol and sodium sulfate are shown 80, 81. An exterior reservoir and filling tube, not shown, can be used to maintain the fill of the ampoule 79 running along the central components support beam 78. Surrounding the cylindrical ampoule 79 are catalytic beads of 1% Platinum on alumina 82.

Adjacent to the fuel ampoule 79 and fueled by the methanol is a fuel cell array 95,94,87,86. This fuel cell array can be made with techniques shown in patents U.S. Pat. Nos. 5,631, 099 and 5,759,712. The fuel cell array 95,94,87,86 receives fuel that diffuses from the fuel ampoule and utilized air that diffuses through the perforations 88 of the cylinder.

The fuel cell 95,94,87,86 can have selectively permeable membranes that allow it to filter the fuel for hydrogen and methanol and retain water and keep the insect bodies and larger hydrocarbons from interfering with the operation of the fuel cells. The fuel cell 95,94,87,86 can run on the hydrogen that is produced by the fuel rich catalytic operation near the fuel ampoule 79. The fuel cells 95,94,87,86 can be held with electrical insulating substrates such as ceramics that can withstand the high temperature operation of this heater and fuel cell and the corrosive environment of the fuel cell.

The selectively permeable membranes of the fuel cell could be platinum coated palladium supported by a ceramic substrate on the fuel side 85 or silicone rubber on the air side 87, or the fuel cells themselves have selectively permeable membranes built into the fuel cell electrodes 85, 87. The air membrane 87 retains the electrolyte and moisture and allows oxygen through such as 30-micron thick silicone rubber.

The fuel cell electrolyte 86 is phosphoric acid doped PBI from PEMEAS GmbH, Industriepark H chst, G864, 65926 Frankfurt/Main, Germany. This particular membrane electrolyte can be leached if excess water is present and flows away from the fuel cell. Thus the membrane filters on the fuel cell serve the purpose of retaining water 95,94,87,86. These particular fuel cells would ideally operate at elevated temperatures to maintain a low relative humidity around the electrolyte 86 to keep the electrolyte immobile. Thus the catalytic heater and the temperature regulation of maintaining the temperature above 32 C are a synergistic function with the fuel cell.

This fuel cell array shown 95,94,87,86 has individual fuel cells connected in series or could be a single cell. The fuel cell 95,94,87,86 can be made with high temperature electrolytes. The electrical power output wires 92,93 go to the DC electric motor 91 to drive the helical mesh cylinder 83. The coil of the cylindrical mesh helix 83 is shown with a clearance of less than 1 mm from the surface of the inner catalytic heater 84 and fuel cell perforated cylinder 88. The mesh cylinder 89 is made of stainless steel mesh or perforations in the cylinder, with mesh openings 90 approximately less than 1 mm in diameter to prevent the insects from being able to fly or crawl through.

A non-porous rotating helix 83 could be used, but then it is essential that the air moved by the helix flow through the pores 90 at the bottom of the rotating cylinder 89. A deflection plate 97 could be placed on the outside of the inner cylinder 84 to act as a mechanism to stop the air flow that is entrained with the rotation of the helical mesh 83 and possibly be useful in stirring or moving the resulting accumulation of insect bodies in the trap. The deflection plate 97 could also be used as an insect crushing-grinding mechanism and eventual removal of the insect bodies through the perforations of the rotating cylinder 90. The outer housing 96 can have openings 99 to allow crushed insects bodies to fall through to the ground outside the trap while securing the motor and catalytic heater. The outer housing 96 has a tan non-insect-distracting coating.

Figure 5:
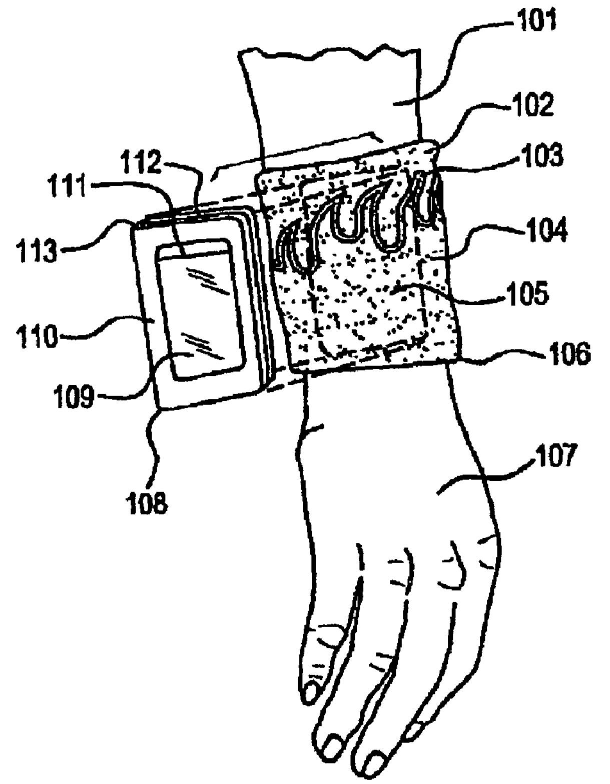
FIG. 5 Wrist band shown on human wrist and diffusion ampoule.

In FIG. 5 a vapor emitting wristband 106 is shown. This wristband 106 is made with wicking fabric to draw moisture from the skin contact out to the surface of the wristband. Cool Max® polyester fabric, silk, or an elastic weave Nylon are possible construction materials. Woven polypropylene and non-woven polypropylene are possible materials. On the outer surface the fabric can have a zone 102, 103,104 which is treated to have an infrared emissivity similar to skin, water, or blood such as a coating of titanium dioxide. Other possibilities are to make the pattern 102,103,104 sewn onto the wristband made of dyed cotton fabrics.

On the outer surface of the wristband is a pattern of a black area 104, yellow area 103 and a red area 102 dyed into the wristband 106. Within the wristband 106 there is a hollow cavity 105 for the membrane ampoule. There is a pocket opening on the inside of the wristband, not shown, to allow the membrane ampoule to be inserted into the wristband. The ampoule 108 can be designed to go around much of the circumference of the human wrist 10, but has been shown for simplicity to only be within a fraction of the wristband. It is also possible to have multiple ampoules and pockets.

It may also be necessary to have multiple ampoules that are designed with different membranes and thickness to deliver different scents to achieve proportioned air concentrations for desired effects of attraction, repulsion, or interference. An example is that acetone and lactic acid have different diffusion rates through silicone rubber, and are both attractants and need to be delivered at a constant ratio to be most effective. Thus two separate ampoules can be designed with different volumes, effective areas, and membrane properties to do this.

The membrane ampoule 108 is made of a 1 mm thick silicone rubber sheets 109,113 silicone sealant glued along the perimeter 110 and an impermeable back layer 112, which could be silicone rubber laminated around aluminum foil. The membrane ampoule 108 is filled with chemicals 111 to be vaporized, such as 100% DEET, with a syringe through the silicone membrane after the ampoule 108 has been sealed. Alternatively the ampoule can be partially sealed to form a pouch with an open end and the pouch is filled with the vaporizing chemicals, and then the complete sealing of the pouch is done.

To operate the arm band mosquito repellent device 106 shown in FIG. 5, the membrane ampoule is removed from a sealed pouch 16 as shown in FIG. 2 and is inserted into the internal pocket of the armband 105 under the colored patterns 104,103,102. The membrane ampoule has the impermeable side 112 facing the human wrist 101, and the permeable side 109 facing outward from the wrist. The armband is placed on the wrist 101 to enable the user to freely use their hands 107 and avoids having chemicals on their hands, which can interfere with tasks such as food preparation and fishing.

Figure 6:
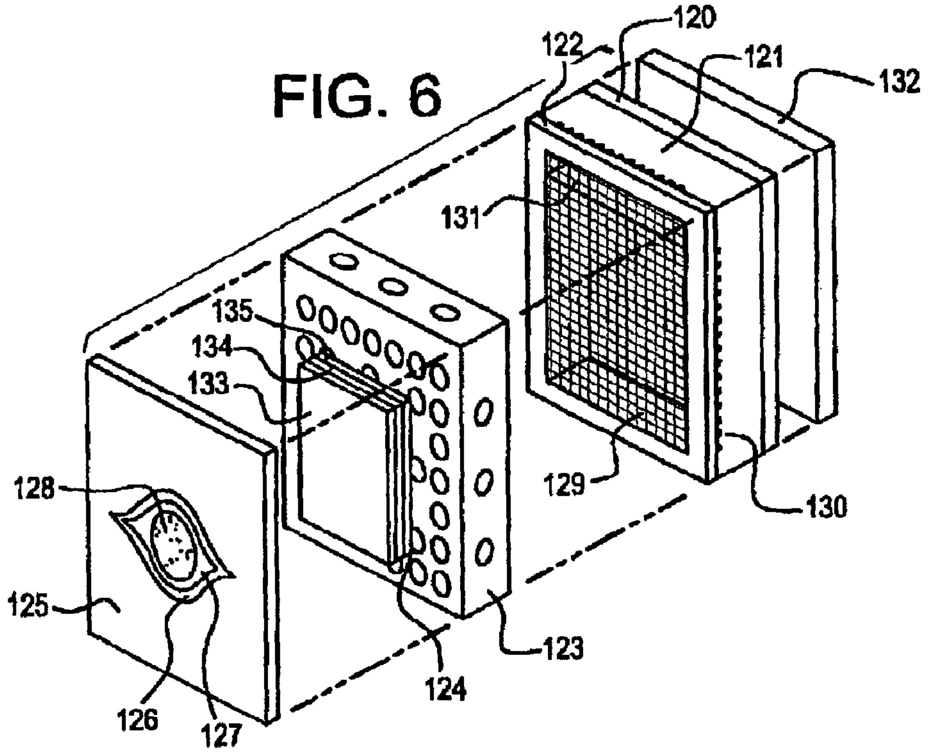
FIG. 6 Membrane catalytic heater attractor exploded view.

FIG. 6 is an exploded view of a catalytic heater combined with a membrane fuel and repellent ampoule and a decoy target. The vapor source fuel and chemical ampoule is shown as an assembly of a back impermeable layer 120 such as aluminum foil, a silicone rubber side wall 121 and a silicone rubber membrane 122 reinforced with a fiber glass 131.

A fiberglass insulated panel or vacuum insulated panel 132 can be placed on the back impermeable wall 120 to block heat transfer. The assembly is glued together with silicone rubber along the perimeter 121. Adjacent to the fuel ampoule is a 0.0625-inch thick sheet aluminum perforated box with 1 mm holes with 30% porosity 123. Inside the perforated box are 1% Pt on alumina catalytic beads and platinum catalyst on rock wool 124. The catalytic heater is described in more detail in co-pending patent application PCT/US02/32041, incorporated herein by reference in its entirety.

On top of the catalytic burner perforated box is a second scent ampoule 133 that diffuses scents that may tend to clog or break down in the catalytic heater. With this ampoule 133 they can be delivered independently from the fuel ampoule 121, scents such as DEET, folic acid, octanol 4-methyphenol (a protein found in human sweat), pyretherine (an insecticide). The scent ampoule 133 is made with an impermeable aluminum foil back layer 135, a silicone rubber frame 134 and a permeable silicone rubber membrane 133.

Surrounding or adjacent to the or the catalytic bed 123 is a porous woven or non-woven cloth cover 125 that has a pattern that has the features of a eye 128,127,126 and the surrounding tissue 125 as a visual target for the mosquitoes. This pattern can be embroidered onto the fabrics or can consist of layers of fabrics and possibly holes to reveal the scent ampoule 133 surface or the catalytic heater surface 123 that can be treated with a coating such as titanium dioxide or hydrophilic materials such as solid polymer electrolyte to emit an infrared spectrum similar to the surface of eyes or warm tissue.

In operation the fuel ampoule 121 is filled from a reservoir with a hose attached or the fuel ampoule, or is pre-filled with combustible fuels such as methanol, ethanol, diemethylether, formic acid or formaldehyde and scents in concentrations of approximately 1% such as DEET, lactic acid, octanol, 4-methyphenol (a protein found in human sweat), pyretherine (an insecticide). Salts such as sodium sulfate decahydrate are added to the ampoule to act as a temperature control, and sodium sulfate is added to act as a water absorbent 131. The fuels 131 such as methanol diffuse though the membrane 122 and catalytically combust in the catalytic bed 123 with the oxygen diffusing through the outer cover from the air 125. The catalytic heater 123,121 limits its temperature to around 36° C. by reducing the fuel input when the sodium sulfate decahydrate in the fuel ampoule 121 releases water, absorbing heat, reducing the vapor pressure of the fuel diffusion and diffusing some water to the catalyst 124 which reduces the catalytic combustion.

The cloth reinforcing 129, 130 of the silicone membrane can also serve as a wicking material on the inside of the fuel ampoule to maintain liquid contact on the diffusion membrane and thereby maintain a steady delivery of chemicals through the membrane, even though the ampoule is gradually emptying and may be filled with gas. Other materials such as diatomaceous earth or fumed silica can be added to the fuel and salt hydrate mixture 131 to maintain contact with the membrane as well as to keep the salt hydrate suspended and avoid a settling out behavior that can occur because of its higher density from the fuel and salt crystals and change in dimensions from hydration to dehydration.

Scents in the fuel 131 diffuse through the membrane 122, diffuse through the catalytic bed 123 and out through the surface of the cloth 125. The scents attract and can block the odor receptors of insects. The catalytic heater 123 generates carbon dioxide and water attracting insects. The warm temperature of the heater 123 coupled with the coatings and color patterns 128,127,126 provide an attractive infrared and visible target for insects. This device can be used as an insect attractor, insect sensor blocker and disabler and as an insect decoy. It can be part of a stationary device or a mobile device or worn as part of apparel on humans and animals.

Figure 7A:
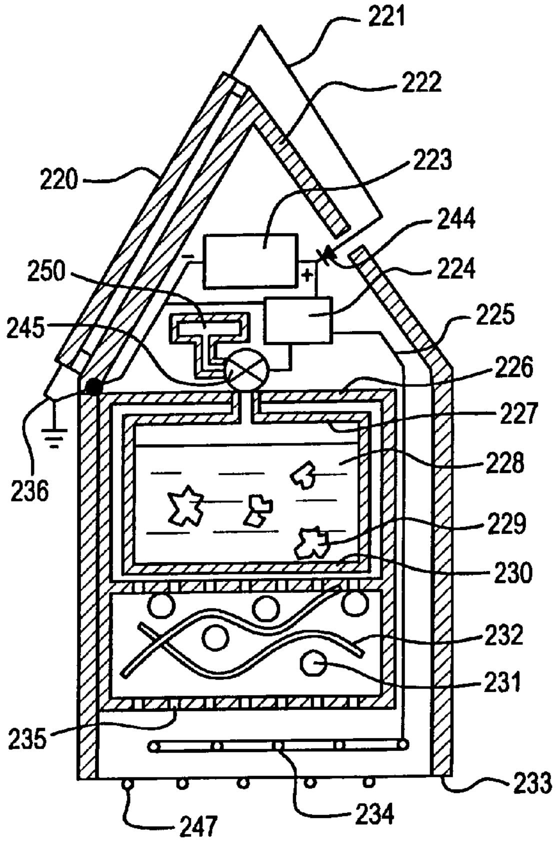
FIG. 7A Cross-sectional view of a high voltage electrical discharge mosquito trap with catalytic heater, with photovoltaic cell electrical power source.

In FIG. 7A a cross-sectional view of a high voltage electrical discharge mosquito trap with catalytic heater, thermopile, fuel cell, or photovoltaic cells is shown. The central attraction target is a heated infrared and scent emitting spot 235. In this trap the attraction surface 235 is on the bottom of the system. This example of the mosquito trap uses a catalytic heater and photovoltaic cells 220 and/or batteries 223 as a heat and electrical power source. The electric power from the photovoltaic array source 220 is used to energize the high voltage grid 234.

Mosquitoes are attracted to the heated target and electrocuted by an electrical discharge as they pass between the guard screen 247 high voltage wires 234 and the target 235. The bodies of the mosquitoes then fall down to the ground beneath the trap.

An alternative insect killing mechanism is to use an intense laser, flash lamp or light emitting diode 246 (shown in FIG. 7B) at the entrance 233 of the trap with optical arrangements to blind and or kill insect that are detected entering the trap, possibly through the capacitance change detected by the controlling electronics 224 on the high voltage grid 234 when a insect enters the trap. To conserve energy the high voltage grid 234 could be energized only when an insect enters the trap.

It should also be mentioned that the ampoule 227, 230 could be used to emit a chemical such as acetic acid that reacts with sodium bicarbonate to produce carbon dioxide, thus catalytic combustion is not necessary to produce carbon dioxide. Also to make heat, the ampoule 227 could deliver controlled release of a chemical that acts as a catalyst for another reaction such as water for a corrosion reaction of iron to iron oxide, and by temperature controlling this catalytic chemical delivery, the temperature regulation of the system can achieved.

Behind the target surface 235 is the catalytic heater filled with a bed of alumina beads 231 coated with 1% platinum (Englehard) and alumina silicate fibers 232 coated with platinum (Infragas). Enclosing the bed of catalysts 231, 232 is an aluminum cylinder 235 perforated on either side of the catalysts. Above the catalytic heater 231, 232, 235 is the fuel ampoule 230, 227. This is shown as single bladder filled with methanol, octanol, DEET 228, fumed silica, and Sodium sulfate hydrate 229.

The fuel ampoule 227 could be designed in many forms from insertable ampoules to capillary tubes that are filled from a larger pressurized reservoir 250 through an electronically controlled valve 245. The outer surface 235 of the perforated aluminum cylinder 226 is coated with a red coating to match the infrared and visual electromagnetic emission of shallow surface blood vessels of skin and eyelids. The heater catalytically combusts the methanol as it diffuses through the ampoule membranes 230 to the catalytic sites 231, 232 with oxygen, which is diffusing, from the air under the heater.

Above the fuel ampoule there is an impermeable upper wall of the catalytic heater cylinder 226. A direct DC to DC or DC to AC low voltage to high voltage converter 224 is connected to a battery 223, which is charged with the photovoltaic array 220. High voltage is delivered from the high voltage converter 224 to the electrocution grid 234 next to the heated target 235 through an insulated wire 225. A diode 244 is placed in the circuit 236, 221 with the photovoltaic array 220 to avoid reverse current flow at night through the photovoltaic array 220.

It should be mentioned that utility generated electricity or other sources of electricity can be used when available. More sophisticated electrical circuits can be used to control the energizing of the high voltage grid, and to control the fueling through an electrically controlled valve 245 delivering fuel from a reservoir to the ampoule. This could allow the trap to sense and operate the trap only when mosquitoes are present and are hunting, such as by using the photovoltaic array 220 output to sense sunlight and to set a timer for dusk and dawn operation.

A temperature sensor could be incorporated into the controlling electronics 224 to open the valve 245 and energize the high voltage grid 234 only within the feeding temperature range of mosquitoes. The electronics 224 could sense air temperature, light conditions, and wind speed, such as by an inertial sensor observing wind buffeting, and use a microchip programmed to optimize the efficiency of the trap operation. Attraction lights, vibrators, and sound devices, or even devices to indicate the trap's effectiveness or need of servicing could be incorporated.

Physically holding the photovoltaic array 220 and housing the electronics 224, the fuel ampoule 227, and the catalytic heater 235 is in cone and tube shaped housing 222. The housing 222 could be mounted on a post or hung from tree limbs.

Figure 7B:
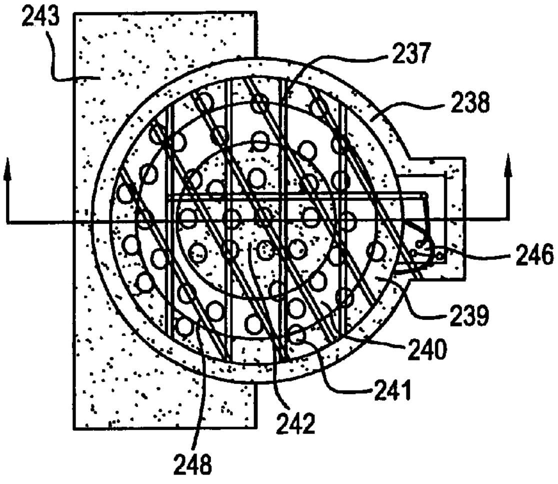
FIG. 7B Bottom view of cross sectional view of high voltage electrical discharge mosquito trap with catalytic heater, with photovoltaic cell electrical power source.

In FIG. 7B the underside target and electrocution area of the mosquito trap is shown. The simulated eye target 235 consists of the central black infrared emission spot 242 that could have a coating or be made of a material that retains water such as sodium chloride, sugar, or solid polymer electrolyte (Nafion). The eye spot/cone is painted with titanium dioxide paint onto an aluminum or stainless steel metal cylinder that holds the catalytic burner 241. The perforations 241 of the catalytic burner are shown. Surrounding the black eye spot 242 is the simulated iris 240 and conjunctiva "white" of the eye formed by painting the edge of black spot with a yellow or white paint, then a border of red or pink 239 and then the tan or light colored housing 238. Over color coatings 242, 240, 239 and patterns a material that retains water or has a infrared emission similar to water, such as titanium dioxide paint or the perfluorosulfonic acid (Nafion®) or Sulfinated Butyl Rubber and polystyrene (DAIS-Analytic) is painted on.

Across the entrance to the housing tube 238 and the central spot are the guard screen 248 and the high voltage wires 237. The high voltage is generated from the electrical high voltage power source. The guard screen can be placed around the entire trap or around the entrance to the bottom of the trap entrance to prevent accidental contact from humans and animals or large insects with the high voltage grid 248 in the trap.

A schematic illustration of a flash lamp, laser or light emitting diode 246 is shown on the side of the trap. An alternative to killing the mosquitoes by electrocution may be to blind the mosquitoes with a bright flash of light. It may also be possible to choose a light flash source that matches the maximum light wavelength sensitivity of the mosquitoes, such as the water infrared band 3-micron wavelength, to maximize the blinding effect on the mosquitoes, while being un-detectable by humans. The underside of the photovoltaic 243 array is shown along with the cross-sectional line.

Figure 7C:
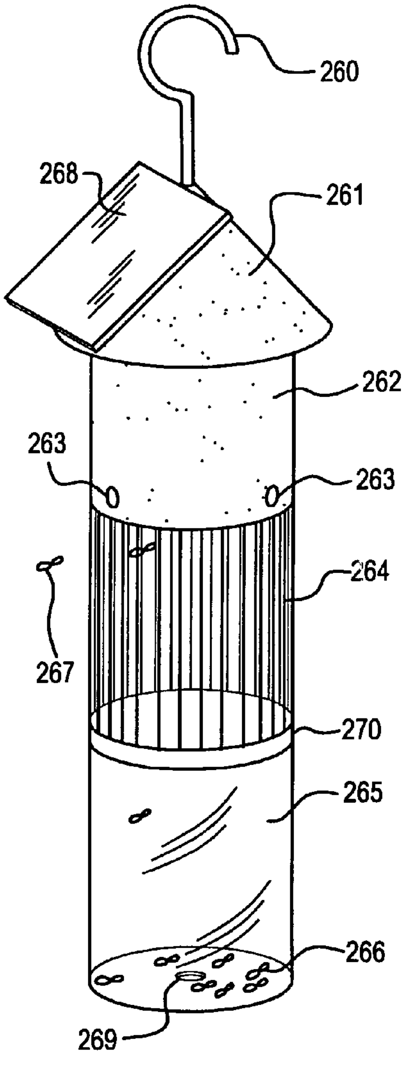
FIG. 7C Exterior view of the high voltage electrical discharge mosquito trap with, photovoltaic cells and sound transducers, protective wires and catch jar.

In FIG. 7C the exterior view of a high voltage electrical discharge mosquito trap with catalytic heater, thermopile, fuel cell, or photovoltaic cells is shown. The catalytic heater and high voltage trap portion 262 are shown as a cylinder with a conical roof 261 to protect the trap from rain falling into the trap 262 and the collection jar 265. The photovoltaic array 268 is placed on the conical roof 261. The hanging hook 260 can have a threaded connection to the conical roof 261 and a locking nut to allow the photovoltaic array to be oriented in the general direction of the sun. The hanging hook 260 can be placed on tree limbs, bars, posts, ropes or the eaves of buildings. Ideally the trap is placed high enough to avoid animal and children interference and in the general area of mosquitoes residence.

Placed in the sides of the trap 262 are three sound transducers 263 or microphones (two are shown). These sound transducers and/or microphones 263 can be used to detect the sound of the female mosquitoes, approximately 500 Hertz and, produce a 500 Hertz sound at about 30 dB to act as a attractive sound such as other female mosquitoes 267 feeding.

Around the base of the high voltage trap is a ring of stiff steel wires 264 to act as a guard ring to prevent humans and animals from reaching the high voltages grids in the trap. Attached to the bottom of the guard ring is a threaded ring 270 and a clear plastic or glass collection jar threaded on 265. The collection jar 265 has a small water vent 269 in the bottom of the jar to drain away any liquid water that might fall into the collection jar. The bodies of the electrocuted mosquitoes 266 fall down from the trap 262 into the collection jar. In operation the trap is in a location where there is sufficient light to energize the photovoltaic array 268 and charge the batteries in the trap.

The trap is activated when the feeding conditions for mosquitoes 267 are electronically determined with the sensors in the trap and the photovoltaic array 268 with are met: such as temperatures above 7° C., wind speed below 6 meters/sec, 4 hours around dawn and 4 hours around dusk. The acceptable environmental conditions may be set to match the feeding behavior of the arthropods to be captured. The heater is turned on, and carbon dioxide, water vapor, and chemical scents are emitted by the trap. To conserve power the trap 262 can activate the high voltage by the sound of the mosquitoes 267 approaching the trap.

The mosquitoes will fly through the grid ring 264 and up into the trap attracted by the sound of other female mosquitoes and the chemical scents and the visual and thermal target of the trap 262. When the mosquitoes approach the target up inside the trap 262 they will be electrocuted by an electrical discharge from the trap. Their bodies 266 will then fall down into the collection jar 265.

Figure 8:
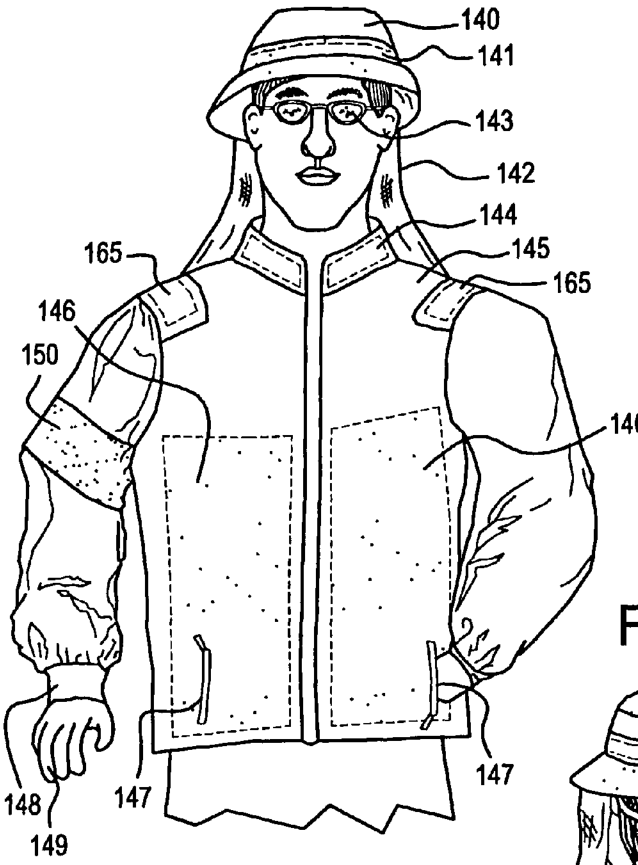
FIG. 8 Front view of upper body of possible locations of heaters, insect repellent, insect confusion, or insect attraction devices incorporated into apparel.

In FIG. 8 the possible locations of membrane catalytic heaters and/or insect repulsion devices are shown located on human apparel. Heaters can be located in inside the pocket 147 area of a vest or jacket 145. This allows the user to be able to heat their hands 149 when needed. The pocket heater 146 can emit DEET vapors. Catalytic heaters 146 can be located in a pocket in the lower and upper back area of the vest or jacket.

These heaters can be used to keep the wearer warm and emit DEET vapors and also pleasing scents. Ampoules and decoy images that are not catalytic could also be located at these locations to use body heat to emit chemical vapors and distract and impair insects. Wristband 148, armband 150, shoulder patches 165, neck bands 144, eyewear 143, hat, 140, neck cape 142, and headband 141 heated or unheated ampoules and/or insect ampoules are shown. The heaters with or without scents can be used just to heat portions of the human body for comfort or therapy. The temperature regulating features of the ampoules combined with the catalytic heaters are important in delivering a safe and acceptable heat delivery to the human.

Other mechanisms that could be incorporated with the heaters are vibrating and periodic constriction devices, such as in the arm band 150, that could be used to massage and induce circulation in humans. They can also make the decoy more attractive to arthropods that can detect periodic motion.

Periodic cycling with on-off cycles to deliver a cycling temperature to the skin can also be therapeutically useful to increase blood circulation.

Figure 9:
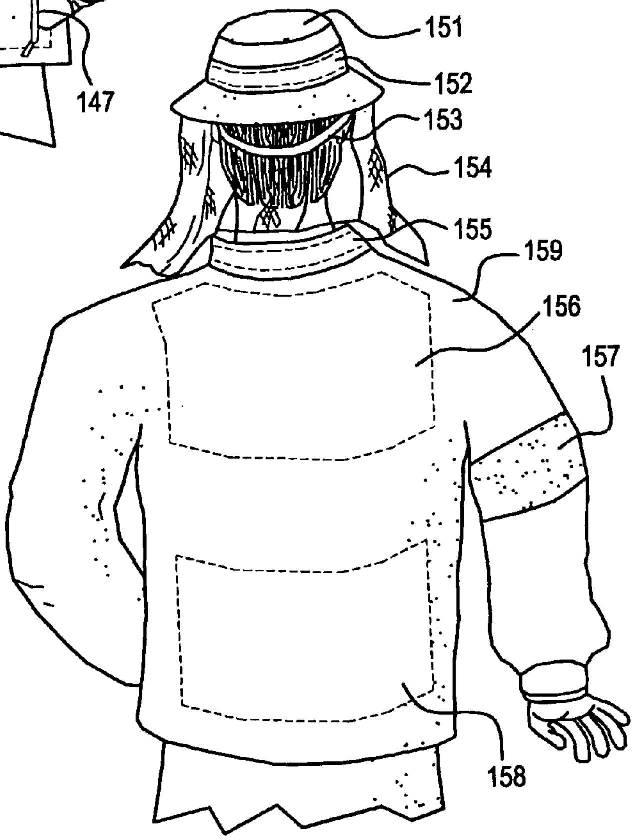
FIG. 9. Back view of upper body of possible locations of heaters, insect repellent, insect confusion, or insect attraction devices incorporated into apparel.

In FIG. 9 the possible locations of membrane catalytic heaters and/or insect repulsion devices are shown located on the backside of human apparel. Heaters can be located in inside the upper 156 and lower portions 158 of a vest or jacket 159 inside pockets or attached to the outside of the apparel with Velcro or adhesives. Heat distribution can be done by forming the fuel ampoule covering a larger area that has the catalytic heater and with impermeable perimeter or liquid filled sealed ampoules or heat pipes.

Also shown are the heater, decoy, or insect repulsion devices located on the eyeglass strap 153, shirt collar 155 or hatband 152. The catalytic heaters can be located in a pocket in lower back 158, upper back area 156, collar 155, arm band 157, and head band 152 to keep the wearer warm and emit DEET vapors and also pleasing scents. A hat skirt 154 can be used just to protect portions of the head and neck and cover as much of the exposed skin as possible.

Thermal insulation such as Thinsulate® (3M Corporate Headquarters, 3M Center, St. Paul, Minn. 55144-1000) or vacuum insulation panels could be located between the heater and the person when it is not desirable to heat the human while still running the catalytic heater to repel or distract insects. One possible arrangement is to have an inside and outside pocket 158, 156 that permits the user to place the catalytic heater inside or outside the insulation of the jacket or hat.

Ampoules and decoy images that are not catalytic could also be located at these locations to use body heat to emit chemical vapors and distract and impair insects. The heaters with or without scents can be used just to heat portions of the human body for comfort or therapy. The temperature regulating features of the ampoules combined with the catalytic heaters are important in delivering a safe and acceptable heat delivery to the human.

Other mechanisms that could be incorporated with the heaters such as in the arm band 157 and lower and upper back panels 156,158 are vibrating and periodic construction devices that could be used to massage and induce circulation in humans. The heating of the skin under the heater or by self-heating due to the thermal insulation of the ampoule can be used to dilate the skin pores and deliver chemicals through the skin from a diffusion ampoule in contact with the skin. The eyeglasses strap 153 can be formed as a hollow tube of nylon fabric with a sealed silicone rubber tube ampoule filled with DEET, sodium sulfate, and other emission chemicals inside. The sodium sulfate additive can act as a dehydrating mechanism to keep the vapor pressure of the DEET high at temperatures below 32 C.

Above 32 C the dehydration of the water from the sodium sulfate will act to reduce the vapor pressure of the DEET and interfere with the diffusion of DEET toward the diffusion membrane. Thus, the sodium sulfate additive works to stabilize the temperature sensitivity of the delivery of DEET. The outer fabric surface is coated with a titanium dioxide striped pattern of black, white and tan bands to act as and attractive image decoy for the insects.

In FIG. 10A the hat with an insect repellent ampoule inserted into a band around the perimeter of the hat is shown. The hat 170 and hatband 171 are made from cotton fabric and dyed or painted with a titanium dioxide painted color pattern or materials with a high infrared emissivity. The color pattern shown in the close-up view consists of bands of black 175, yellow or white 174, 176 and red or pink 173, 177. The remainder of the hat 178, 170 consists of light colors of tan and can be dyed or painted with materials with a low infrared emissivity. The hatband 172 is heated though catalytic heating or heat transfers from the wearer to deliver scents such as DEET and make a thermally attractive target for insects.

In FIG. 10B a catalytic heater located in a pocket on a glove is shown. In this figure the pocket 181 is located on the backside of the glove. A circular pattern 182, 183, 184 either formed by painting, dying or forming a hole to reveal the surface of the chemical ampoule is shown. The pattern consists of a black central spot 182, a yellow perimeter 183, and a red or pink outer perimeter 184. The glove 180 is tan or a low emissivity and dry surface and made of a hydrophobic material such as GoreTex® (W.L. Gore & Associates, Inc., 555 Papermill Road, Newark, Del. 19711). The circular patterned surface 182, 183, 184 incorporates or is formed from a material that has an emissivity of thin skinned blood containing tissue. The heat from the catalytic heater can be used to warm the hand in the glove 180, or the heater can be located outside the insulation of the glove to act as heated attractive decoy for mosquitoes.

In FIG. 11 the possible locations of membrane catalytic heaters and/or insect repulsion devices are shown located on a boot 206 or on the sock ankle area 196 of a human. A catalytic heater is formed to fit the curved shape of the boot. A heat pipe 207 is part of the lower edges of the heater and goes around the toe area of the boot to transfer heat into the toe area. This heater consists of a perforated sheet metal brass box 202 filled with 1% platinum by weight on alumina beads and Infragas catalyst coated rock wool. The fuel ampoules 198 are made of pine or other porous woods soaked in methanol and scent chemicals and salts. The wooden ampoule 198 is inserted into the perforated metal 201 slot 200 located inside the perforated metal box 202 filled with catalysts. A brass cover door 197 is used to cover the slot ampoule. The side of the heater toward the boot 206 is painted black to radiate thermal energy to the boot. The outer surface of the heater can have a cloth covering of high temperature fabric such as PBI non-woven, and a pattern 205, 204, 203 that is attractive to insects and acts as thermal insulation to retain heat around the boot and heater.

On the ankle region of the leg 190, 196 a sock or ankle band 195 with a pouch 191 for the permeable ampoule filled with the insect attracting and sensor interference chemicals is located. The outer surface of the sock 195 can have patterns and colors that attract insects consisting of a black spot 194, a white or yellow perimeter 193 and a red or pink perimeter 192. Outside of the color patterns the remainder of the anklet or sock 195 is coated, formed, or colored with a material with a low thermal emissivity such as a light tan 199 GoreTex®. These attraction patterns 194, 193, 192 can be formed or coated with a substance such as titanium dioxide or with a material that emits infrared light similar to soft tissue of an animal. The catalytic heaters, insect attraction repulsion devices, or chemical delivery ampoules can also be placed in helmets, glasses frames, goggles, glasses straps, belts, pants, dresses, capes, rain coats and sleeping bags.

List of Components in Figures

FIG. 1. Eye image cloth wristband with a dual insertable repellent scent ampoule.

1. Cloth wrist, ankle, neck, head or hat band with interior pocket.
2. Grey, white, silver, or tan, (light colored) cloth.
3. Red, magenta or pink colored cloth.
4. White or yellow colored.
5. Black colored cloth.

6. Slit opening into the interior of the cloth band pocket.
7. DEET and scents filled silicone rubber ampoule outer membrane.
8. Second silicone rubber membrane and ampoule for the more volatile fluids.
9. Interior side wall silicone membrane.
10. DEET fluid inside the ampoule.
11. Perimeter spacer material or inner porous material.
12. Stabilizing chemical crystals and wicking material.
13. Aluminum foil sheet.
14. Stabilizing chemical and wicking material.
28. Second more volatile fluids of acetone, methanol, ethanol, and folic acid.

FIG. 2. Chemical diffusion ampoule and sealed packet.

15. Heat-sealed perimeter of the impermeable ampoule pouch.
16. Impermeable outer ampoule pouch.
17. Permeable seal of the silicone rubber or urethane rubber pouch.
18. Selectively permeable ampoule.
19. DEET in ampoule and suspension matrix or material.
20. Slit apart other half of outer impermeable ampoule.
21. Pouch opening in outer impermeable pouch slit open.
22. Pouch opening in outer impermeable pouch slit open.
23. Inner porous material and spacer.
24. Impermeable back membrane.
25. Chemical crystals such as Sodium sulfate hydrate.
26. Aluminum foil back.
280. Outer membrane.
281. Frame material.
282. Hydrate salt.
283. DEET and scent fluids.
284. Back impermeable membrane.
285. Back wall.

FIG. 3A Fan driven mosquito trap system top view of heated spot.

30. Black central heated disk.
31. White or yellow perimeter disk.
32. Red or pink sides on throat of flow channel.
33. Outer flow channel and case tan, white or brown (light colored).
67. Carbon dioxide and scent vent.
68. Fresh air intake channel to fuel cell.

FIG. 3B Fan driven mosquito trap system side view cross-section.

34. Central black heated disk.
35. White or yellow perimeter on disk.
36. Methanol fuel.
37. Chemical hydrate such as sodium sulfate hydrate.
38. Selectively permeable membrane.
39. Catalytic beads and fibers.
40. Negative electrodes from fuel cell to fan.
41. Cathode on fuel cell array, could also be a thermopile.
42. Electrolyte on fuel cell array element.
43. Anode on fuel cell array.
44. Recirculated air flow.
45. Outer air flow from fan.
46. Air flow from fan.
47. Fan motor.
48. Fan blades.
49. Insect filter mesh.
50. Trapped insects.
51. Air filter mesh to fuel.
52. Air flow from fan.
53. Air flow from intake.
54. Perforation to let air into catalytic heater.
55. Positive electrode from fuel cell output.
56. Recirculated airflow.
57. Flying insects.
58. Electrical via contact in fuel cell array.
59. Fuel cell air manifold.
60. Alumina silicate fibers coated with platinum.
61. Cotton fibers or suspension matrix.
62. Entrance of trap.
63. Air flow from intake.
64. Fresh air inflow to fuel cell and air intake channel.
65. Carbon dioxide and scent vent flow.
66. Carbon dioxide and scent vent hole.

FIG. 4A Rotating helical mesh trap top view of heated spot.

70. Black spot heated fuel tank.
71. Gap between the stationary target and the rotating helix.
72. Screen mesh helix.
73. Center support and view shield.
74. Leading edge of the rotating mesh helix colored pink or red.
75. Outer hub of rotating helix.
76. Air gap between rotating helix hub and outer case.
77. Outer case, tan colored.

FIG. 4B Rotating helical mesh trap side cross-sectional view.

78. Center support.
79. Selectively permeable fuel ampoule.
80. Methanol fuel.
81. Hydrated salt such as sodium sulfate hydrate.
82. Catalyst beads on alumina supports.
83. Screen mesh helix.
84. Pores in catalytic heater tube.
85. Positive anode of the fuel cell array element.
86. Porous electrolyte.
87. Air cathode electrode of the fuel cell array element.
88. Air vents for air supply to fuel cell cathodes.
89. Exterior or helix hub.
90. Small pores to allow some air flow out of the mosquito trap.
91. Electric motor.
92. Positive electrode wiring from fuel cell to motor.
93. Negative electrode wiring from fuel cell to motor.
94. Via interconnect on fuel cell array.
95. Cathode electrode on fuel cell array.
96. Outer case (tan colored).
97. Insect wiper crusher.
98. Permeable central spot.
99. Exit aperture.

FIG. 5 Wrist band shown on human wrist and diffusion ampoule.

101. Human arm.
102. Red or pink colored area of wrist band.
103. Yellow or white colored area of wristband.
104. Black colored area of wristband.
105. Chemical emitting area where ampoule is placed inside wristband.
106. Cloth wrist band with interior pocket or void.
107. Human hand.
108. Chemical emitting ampoule.
109. Membrane permeable to chemicals.
110. Sealed perimeter of ampoule.
111. Chemical in ampoule.
112. Back wall of ampoule impermeable to emitting chemicals.
113. Outer ampoule permeable membrane sealed to the impermeable membrane.

FIG. 6 Membrane catalytic heater attractor exploded view.

120. Impermeable back wall material.
121. Frame material.

122. Methanol permeable membrane.

123. Perforated aluminum metal box filled with catalytic felt and beads.

124. Ventilation holes in perforated metal box with catalyst inside.

125. Tan or brown colored fabric.

126. Red or pink colored fabric.

127. Yellow or white colored fabric.

128. Black spot on fabric.

129. Wicking cloth.

130. Fiber cloth ends.

131. Fuel and chemicals inside such as: methanol, lactic acid, octonol, DEET, and sodium sulfate hydrate.

132. Insulated back wall.

133. Outer permeable membrane of the scent ampoule.

134. Frame of the scent ampoule.

135. Back impermeable wall of the scent ampoule.

FIG. 7A Cross-sectional view of a high voltage electrical discharge mosquito trap with catalytic heater, with photovoltaic cell electrical power source.

220. Photovoltaic cell.

221. Electrical output from solar cell.

222. Cone on top of case.

223. Battery.

224. DC low voltage to high voltage DC or AC voltage converter and control system.

225. High voltage wire.

226. Heater box case.

227. Fuel and scent ampoule.

228. Liquid fuel; methanol, scents and salts.

229. Sodium sulfate hydrated with water.

230. Permeable membrane.

231. Alumina beads coated with platinum catalyst.

232. Alumina silicate fibers coated with platinum catalysts.

233. Dielectric outer tan colored case.

234. High voltage grid wires.

235. Porous catalytic burner box.

236. Grounded wire connection from battery to DC converter and photovoltaic cells.

244. Diode.

245. Electronically controlled valve.

246. Laser, flashlamp, or light emitting diode.

247. Guard screen.

248. Guard screen.

250. Pressurized reservoir.

FIG. 7B Underside view of the electrocution insect trap with catalytic chemical vapor and heat source.

237. High voltage wires.

238. Outer tan case.

239. Red colored titanium oxide coated surface of the heater.

240. White or yellow color titanium oxide coated surface of heater.

241. Holes in perforated metal of heater.

242. Black central spot with a coating that simulates a moist eye.

243. Under side view of photovoltaic cells.

FIG. 7C Exterior view of the of the electrocution insect trap with photovoltaic array catalytic chemical vapor and heat source.

260. Hanging hook.

261. Conical shaped roof cover.

262. The mosquito trap and scent emitters.

263. Sound emitters and detectors.

264. Guard wires.

265. Clear plastic or glass collection jars.

266. Dead mosquitos collected at the bottom of the trap.

267. Mosquitos attracted to the trap.

268. Photovoltaic array.

269. Water drain hole at the bottom the collection jar.

FIG. 8 Front view of upper body of possible locations of heaters, insect repellent, insect confusion, or insect attraction devices incorporated into apparel.

140. Hat.

141. Hat band.

142. Hat skirt cloth

143. Glasses or goggles.

144. Neck band repellent.

145. Shirt or jacket.

146. Body heaters in jacket.

147. Pocket.

148. Wrist band.

149. Hand.

150. Arm band.

165. Shoulder attractant and repellent.

FIG. 9. Back view of upper body of possible locations of heaters, insect repellent, insect confusion, or insect attraction devices incorporated into apparel.

151. Hat.

152. Hatband.

153. Glasses or goggles strap.

154. Neck hat skirt.

155. Collar heater or band.

156. Upper back heater.

157. Shirt or jacket.

158. Lower back heater.

159. Jacket.

FIG. 10A. Hat with insect repellent, insect confusion, or insect attraction band and enlarged view of band color patterns.

170. Hat.

171. Hat band.

172. Ampoule inside band.

173. Red or pink dyed band.

174. Yellow or white dyed band.

175. Black dyed band.

176. Yellow or white dyed band.

177. Red or pink dyed band.

178. Tan dyed fabric of hat.

FIG. 10B. Glove with insect repellent, and or heater.

180. Tan colored glove.

181. Ampoule and or heater inside glove pocket.

182. Black dyed cloth spot.

183. Yellow, white or silver dyed cloth.

184. Red or pink dyed cloth.

FIG. 11 Placement of ankle insect repellent and shoe heater.

190. Leg.

191. Ampoule in ankle band or sock.

192. Red or pink dyed area.

193. Yellow, silver, or white area on band.

194. Black dyed area on band.

195. Tan dyed ankle band or sock.

196. Leg and sock.

197. Cover door on heater.

198. Wooden ampoule filled with methanol fuel.

199. Tan colored catalytic heater.

200. Slot in heater box.

201. Inner perforated metal apertures.

202. Perforations in mesh containing catalysts.

203. Red or Pink colored area.

204. Yellow, silver, or white colored area.

205. Black colored area.

206. Boot.

207. Heat pipe.

Company Names/Materials/Addresses

Specialty Silicone Fabricators Inc.
3077 Rollie Gates Dr.
Paso Robles, Calif. 93446
Englehard
Chemical Catalyst Group
554 Englehard Dr.
Seneca, S.C., 29678
Infragas S. p. A.
via Lavoresco
10-10072 Caselle
(TO) Italy
DAIS-Analytic Corporation
11552 Prosperous Dr.
Odessa, Fla., 33556
Perfluorosulfonic Acid, (Nafion®)
DuPont Corporation.
Alcohol solutions available through: Solutions Technology, Inc., P.O. Box 171, Mendenhall, Pa. 19357.
Texollini
2575 El Presidio St.
Long Beach, Calif. 90810
PEMEAS GmbH,
Industriepark Hochst, G864
65926 Frankfurt/Main, Germany
Thinsulate®
3M Corporate Headquarters
3M Center
St. Paul, Minn. 55144-1000
GoreTex®
W.L. Gore & Associates, Inc.
555 Papermill Road
Newark, Del. 19711

Essential features include, but are not limited to, the following:

1. Chemicals that attract, repel, or interfere with insect or arthropods behavior delivered though a selectively permeable membrane, molecularly selective membrane or chemically permeable layer.
2. The selectively permeable membrane allows chemicals to be delivered and not back diluted by the product water.
3. Using different and multiple membrane ampoules to deliver chemicals.
4. A chemical additive to the mixture contained by the membrane that controls water content of the mixture to maintain delivery rates of diffusing chemicals over a range of temperatures and humidities.
5. Chemicals that attract, repel, or interfere with insect behavior are contained in a permeable membrane or material and also contain a fuel for a catalytic heater or fuel cell or combustion driven device.
6. Using patterns and colored surfaces and different infrared emitting surfaces to attract and channel insects toward traps or decoy surfaces.
7. Creating surfaces that simulate the prey of insects.
8. Using carbon dioxide emission to attract insects.
9. Using moisture emission to attract insects.
10. Using chemical emissions to attract insects.
11. Using black and red and yellow patterns to attract insects.
12. Using sound emissions to attract and startle and repel insects.
13. Using light to attract startles, or blind insects.
14. Using warm moist surfaces to attract insects.
15. To use a sequence of attraction, visual attraction, chemical sensor disabling, and startling to disable insects.
16. To use a sequence of attraction, chemical sensor disabling, and visual attraction and then trapping.
17. Packaging the systems as apparel.
18. Forming an impermeable barrier on the permeable ampoule to block diffusion of arthropod interference compounds from reaching the skin.
19. Packaging the heater system with insulation or super insulation on one side to insulate the person from the heater or insulate the person from the cold.
20. Packaging the system as a stand-alone appliance.
21. Packaging the system as part of an AC powered appliance.
22. Packaging the chemical ampoules in sealed outer ampoules to be opened when needed.
23. Using body heat, combustion heat, catalytic heaters, or fuel cells or thermal mass to enhance the diffusion rate delivery.
24. The material additive to the fuel can act as a fire retardant and extinguisher as it phase changes with heat and decomposes.
25. Suspension materials such as diatomaceous earth to keep the hydrate chemicals suspended.
26. The compound effect of the hydrates releasing water and the water affecting the catalysts or inhibiting reactions in the heaters acting to slow down the reactions that can be used to create an autothermostatic system.
27. The compound effect of the water released from the hydrate causing the membrane to change its permeability another compound changing form in the fuel such as hydrogel to block fuel diffusion. Water release can cause mechanical mechanisms to change form.
28. Using a rotating mesh or permeable helix to trap insects.

While the invention has been described with reference to specific embodiments, modifications, and variations of the invention may be constructed without departing from the scope of the invention, which is defined in the drawings and the following claims.

I claim:

1. A wearable arthropod sting reduction apparatus comprising:

a chemical system comprising a gaseous molecular delivery system and a chemical or chemicals that attract, repel or interfere with insects behavior, further comprising a container having a permeable layer to contain and release chemical gaseous molecules of said chemicals that attract, or repel or interfere with insects behavior by diffusion through the permeable layer; said chemicals comprising a component that changes chemical state with temperature and acts to moderate the chemical gaseous molecules diffusion rate or vapor pressure;

a surface comprising indicia having a configuration colored and shaped to simulate an eye and eye perimeter tissue; and wherein said chemical system is coupled to said surface such that diffusion of said chemical gaseous molecules through said permeable layer is associated with said indicia at a location that enables said indicia to further simulate infrared emissions of a warm blooded animal.

2. The apparatus of claim 1, wherein the permeable layer comprises a molecularly selectively permeable layer to contain and release chemical molecules by diffusion through the selectively permeable layer.

3. The apparatus of claim 1, further comprising three or more chemicals and an auto thermostatic system that uses the three or more chemicals wherein the chemicals interact with each other to modulate production of heat to maintain a temperature.

4. The apparatus of claim 1, wherein said chemicals comprise arthropod affecting chemicals; wherein said chemical system uses the permeable layer to contain and release the arthropod affecting chemicals by diffusion through the permeable layer.

5. The apparatus of claim 2, wherein said chemicals comprise arthropod affecting chemicals; wherein said chemical system uses the molecularly selectively permeable layer to contain and release the arthropod affecting chemicals by diffusion through the selectively permeable layer.

6. The apparatus of claim 4, further comprising a body contact, catalytic heater, or fuel cell heat source.

7. The apparatus of claim 1, wherein a release of arthropod affecting chemicals by diffusion through the membrane comprises releasing molecules that attract and then disable chemical sensors of insects and wherein the container has an impermeable layer on one side.

8. The apparatus of claim 4, wherein the container further comprises an impermeable membrane to contain the chemicals before use.

9. The apparatus of claim 5 wherein the container further the selectively permeable membrane and an impermeable membrane to contain the chemicals.

10. The apparatus of claim 1, wherein said surface has a source of electromagnetic emissions characteristic of eye and eye perimeter tissue of warm-blooded animals.

11. The apparatus of claim 10, further comprising an arthropod attractant or decoy that uses a distinct configuration resembling the eye with a dark feature with borders of red and yellow.

12. The apparatus of claim 1, further comprising a fuel cell and catalytic heater coupled together with a common fuel supply such that they regulate temperature of the component of the contained chemicals that change chemical state with temperature and acts to moderate the diffusion rate or vapor pressure of the chemical fluid.

13. The apparatus of claim 2 wherein the molecularly selectively permeable layer is molecularly selectively permeable with a high permeability to carbon dioxide, alcohols, and hydrocarbons, and low permeability to water.

14. The apparatus of claim 2 wherein the molecularly selectively permeable layer is molecularly selectively permeable with a high permeability to as N,N-diethyl-metatoluamide (DEET) and low permeability to water.

15. The apparatus of claim 1, wherein the permeable layer is silicone rubber.

16. The apparatus of claim 1, further comprising an energy conversion system and wherein the chemicals delivered through the membrane are used as reactants to energize the energy conversion system to generate heat with temperature regulation of the vapor pressure or diffusion control used to achieve thermostatic control.

17. The apparatus of claim 1 wherein the chemicals delivered through the permeable membrane are used as reactants in a heater to make heat, and the temperature regulation of the vapor pressure or diffusion is used to achieve thermostatic control.

18. The apparatus of claim 1 wherein the delivered chemicals are used as reactants in a heater to make heat and the temperature regulation of the vapor pressure or diffusion is used to achieve thermostatic control and an arthropod attractive target.

19. The apparatus of claim 1 wherein delivered chemicals are used as reactants in a heater to make heat and the temperature regulation of the vapor pressure or diffusion rate of molecules is used to achieve thermostatic control, which can be used for therapeutic purposes in contact with humans or animals.

20. The apparatus of claim 1 wherein delivered chemicals are used as reactants in a heater to make heat and the temperature regulation of the vapor pressure or fluid diffusion is used to achieve thermostatic control.

21. The apparatus of claim 1 wherein diffusing chemicals are catalytically combusted with oxygen from the air.

22. The apparatus of claim 1 wherein delivered chemicals are used as reactants in a fuel cell to make heat, and temperature regulation of the vapor pressure or diffusion is used to achieve thermostatic control, which can be used for therapeutic purposes in contact with humans and animals.

23. The apparatus of claim 1 further comprising at least one of heater and fuel cell and wherein the at least one of heater and fuel cell receive a diffusing chemical of hydrogen, water, methanol, dimethyl ether, ethanol, formic acid, or formaldehyde, from the permeable layer and utilize oxygen from the air.

24. The apparatus of claim 4 further comprising a catalytic heater wherein the vapors or diffused molecules are used at least in part to generate heat, scents, and carbon dioxide, and to provide an attractive infrared target or to simulate a visual target.

25. The apparatus of claim 4 wherein the vapors or diffused molecules are used as part of an arthropod interference system in the form of an ampoule for attaching to a person or animal to generate scents and provide at least one of a distractive infrared target and visual target.

26. The apparatus of claim 4 wherein vapors or diffused molecules are used as part of an arthropod interference system in the form of an ampoule for attaching to a person or animal to generate scents, and heat and provide at least one of a distractive infrared target and visual target.

27. The apparatus of claim 4 wherein the vapors or diffused molecules are used as part of an arthropod interference system in the form of an ampoule for attaching to a person or animal to generate scents and heat and provide at least one of a distractive infrared target and visual target, and a diffusion barrier is placed such as to be between a human and the ampoule during use.

28. The apparatus of claim 4 wherein the vapors or diffused molecules are hydrogen, water, methanol, dimethyl ether, ethanol, formic acid, or formaldehyde, N,N-diethyl-3-methylbenzamide (DEET), or octanol, used as part of an arthropod interference system in the form of an ampoule with the permeable layer facing out into the air and an low permeable layer that would be facing toward a person or animal during use, and to generate scents and form at least one of a distractive infrared target and visual target with patterns to simulate the eyes of animals with exposure to the membrane.

29. The apparatus of claim 4 wherein the vapors or diffused molecules are hydrogen, water, methanol, dimethyl ether, ethanol, formic acid, or formaldehyde, N,N-diethyl-3-methylbenzamide (DEET), dimethyl disulfide or octanol, used as part of an arthropod interference system in the form of an ampoule with the permeable layer facing out into the air and an low permeable layer that would be facing toward a person or animal during use, and to generate scents and heat with a catalytic heater with platinum dispersed on alumina beads and alumina silicate fibers, and form at least one of a distractive infrared target and visual target with patterns to simulate the eyes and perimeter of eyes of animals with exposure to the membrane.

30. The apparatus of claim 4 wherein diffused molecules are methanol, dimethyl ether, ethanol, formic acid, acetone, or formaldehyde, N,N-diethyl-3-methylbenzamide (DEET), folio acid, lactic acid, citronella, perfumes, sugars, 4-methyphenol, pyrethrum, or octanol contained by the permeable membrane, a water absorbing chemical of sodium sulfate is contained by the membrane, is used as part of an arthropod interference system in the form of permeable membrane or membranes diffusing into a catalytic heater with platinum dispersed on alumina beads and alumina silicate fibers, with air diffusing into the catalytic heater, products of carbon dioxide and water diffusing out of the catalytic heater, forming an attractive infrared target with titanium dioxide, perfluorosulfonic acid or sulfinated butyl rubber and polystyrene coatings visual target with patterns to simulate the eyes and perimeter of eyes of animals.

31. The apparatus of claim 1 wherein a layer of low permeability to the chemicals are formed on one side of the container.

32. The apparatus of claim 2 further comprising a chemical reaction, catalytic heater or fuel cell that uses the molecules of the chemical or chemicals to run the chemical reaction, catalytic heater or fuel cell.

33. The apparatus of claim 2 wherein the chemicals or molecules of the chemicals repel insects.

34. The apparatus of claim 2 wherein the chemicals create carbon dioxide.

35. The apparatus of claim 2 wherein the chemicals are fuel to create carbon dioxide through catalytic combustion to attract insects.

36. The apparatus of claim 2, wherein the chemicals are a fuel to create carbon dioxide through catalytic combustion, or electrochemistry, or interaction with another chemical.

37. The apparatus of claim 1, wherein the chemicals are to create carbon dioxide attractant through the interaction of acetic acid or formic acid diffused through the membrane and interacting with sodium bicarbonate or calcium carbonate.

38. The apparatus of claim 2, wherein diffusion of the molecules of the chemical or chemicals through the permeable membrane attracts insects.

39. The apparatus of claim 2, wherein diffusion of the molecules of the chemical or chemicals through the permeable membrane first attracts arthropods and then blocks their chemical sensors.

40. The apparatus of claim 2, wherein diffusion of the molecules of the chemical or chemicals through the permeable membrane attracts arthropods, block their chemical sensors, and repels the arthropods.

41. The apparatus of claim 2, wherein diffusion of the chemical or chemicals through the permeable membrane attracts arthropods, block their chemical sensors, and repels the arthropods.

42. The apparatus of claim 2, wherein molecular diffusion of the chemical or chemicals through the permeable membrane attracts arthropods, block their chemical sensors, and then attracts the insects to decoy targets through light or sound.

43. The apparatus of claim 2, wherein molecular diffusion of a chemical or chemicals through the permeable membrane attracts, blocks arthropod chemical sensors, and repels arthropods through light or sound.

44. The apparatus of claim 2 wherein the indicia is comprised of a surface coating simulated visual target that simulates the infrared emission of the animal eye, and skin.

45. The apparatus of claim 2 wherein the indicia is comprised of a surface coating of solid polymer electrolytes, water, saline solution, or titanium dioxide simulates the infrared emission of the animal eye and skin.

46. The apparatus of claim 2, wherein an exposed surface of the permeable membrane simulates the infrared emission of the animal eye, and skin.

47. The apparatus of claim 2 wherein a cover of the permeable layer is a wicking surface that wicks sweat and accumulates chemicals contained in sweat.

48. The apparatus of claim 2, wherein the indicia is comprised of an arthropod attractant, or decoy having a distinct spatially defined infrared emitting spot for attracting arthropods.

49. The apparatus of claim 2, wherein the indicia is comprised of an arthropod attractant, or decoy having a distinct defined emitting spot that is warmed above the surroundings and emits attractive chemical to the arthropods, and chemical sensor disabling chemicals.

50. The apparatus of claim 2, further comprising an arthropod attractant, decoy or repulsion device powered by the chemicals released through the layer.

51. The apparatus of claim 2, further comprising an arthropod or insect attractant, decoy or repulsion device wherein the chemicals are contained in an ampoule made of wood.

52. The apparatus of claim 44, further comprising an arthropod attraction system and a catalytic heater or fuel cell to generate heat to keep the simulated visual target at an attractive temperature to insects, also generating carbon dioxide and scents.

53. The apparatus of claim 2, further comprising an arthropod attraction system, a catalytic heater to generate heat, scents, and carbon dioxide and to provide an attractive infrared target, photovoltaic ceils and an electrical energy storage to simulate a visual target.

* * * * *